United States Patent
Garnett et al.

(10) Patent No.: US 7,012,815 B2
(45) Date of Patent: Mar. 14, 2006

(54) COMPUTER SYSTEMS

(75) Inventors: Paul J. Garnett, Camberley (GB);
James E. King, Wokingham (GB);
Martin P. Mayhead, Hindhead (GB);
Peter Heffernan, Chandlers Ford (GB);
Nigel Ritson, Aldershot (GB)

(73) Assignee: Sun Microsystems, Inc., Santa Clara, CA (US)

( * ) Notice: Subject to any disclaimer, the term of this patent is extended or adjusted under 35 U.S.C. 154(b) by 79 days.

(21) Appl. No.: 10/171,809

(22) Filed: Jun. 14, 2002

(65) Prior Publication Data

US 2003/0030988 A1 Feb. 13, 2003

Related U.S. Application Data

(60) Provisional application No. 60/366,430, filed on Mar. 21, 2002, and provisional application No. 60/311,505, filed on Aug. 10, 2001.

(51) Int. Cl.
*H02B 1/01* (2006.01)

(52) U.S. Cl. .................. 361/825; 361/685; 361/680; 361/686

(58) Field of Classification Search ............. 361/825, 361/683, 684, 680, 681, 813, 715, 724, 685, 361/682, 686, 797, 802; 24/164; 202/7
See application file for complete search history.

(56) References Cited

U.S. PATENT DOCUMENTS

| | | | | |
|---|---|---|---|---|
| 5,999,365 A | * | 12/1999 | Hasegawa et al. | 360/97.02 |
| 6,061,244 A | * | 5/2000 | O'Sullivan et al. | 361/727 |
| 6,247,078 B1 | * | 6/2001 | Ebert et al. | 710/301 |
| 6,272,016 B1 | * | 8/2001 | Matonis et al. | 361/716 |
| 6,556,438 B1 | * | 4/2003 | Bolognia et al. | 361/687 |
| 6,614,662 B1 | * | 9/2003 | Stickler et al. | 361/777 |

* cited by examiner

*Primary Examiner*—David Martin
*Assistant Examiner*—Hung S. Bui
(74) *Attorney, Agent, or Firm*—Meyertons Hood Kivlin Kowert & Goetzel, P.C.; B. Noël Kivlin

(57) ABSTRACT

A rack mountable shelf is configured to support a plurality of field replaceable units in the form of server cartridges that each include at least one server processor. The rack mountable shelf is configured to provide communal services for said server cartridges, including at least one of supplying DC operating power to the server cartridges, distributing information signals between the server cartridges and processing system management signals for the server cartridges. Each of the server cartridges can be slideably received in a respective one of a series of server cartridge receiving locations arrayed side by side along the front of the shelf. The server cartridges can be configured as thin blades to provide a high server density. For example, 16 server cartridge receiving locations can be provided across the front of the shelf. The supply of DC operating power to the server cartridges can be provided by one or more field replaceable power supply units (e.g. two redundantly configured power supply units) mounted in the shelf. The distribution of information signals between the server cartridges can be provided by one or more switch units (e.g. two redundantly configured switch units) mounted in shelf. The processing of system management signals for the information processing modules is provided by one or more field replaceable service processor units (e.g. one service processor unit) mounted in the shelf. Each of the power supply, switch and service processor units can be slideably received in a respective receiving location at the rear of the shelf. A midplane including connectors with conductive paths therebetween can provide power, information signal and system mangagement signal connections between received field replaceable units. A multiple computer server can be formed from at least one rack mountable shelf as set out above.

12 Claims, 25 Drawing Sheets

Fig. 12 (cont'd)

COMPUTER SYSTEMS

This application claims priority to provisional application No. 60/311,505, filed on Aug. 10, 2001, and provisional application No. 60/366,430, filed on Mar. 21, 2002.

BACKGROUND OF THE INVENTION

The present invention relates to computer systems, in particular to computer systems suitable for multiprocessor systems, for example multiprocessor server systems.

One application for the present invention relates to high reliability systems, for example, computer server systems for telecommunications applications. In telecommunications applications, it is important to provide high reliability and high capacity of operation. Various approaches have been taken to providing such high-performance, high reliability systems. Typically such systems are designed around providing redundant resources so that if one component of the system develops a fault, the system remains operation using the redundant resources. Redundant operation can be provided by means of special purposes lockstep-operating multi-processor systems. Such systems are typically rack mountable, with each processor system typically occupying a shelf in the rack. The trend in recent times is to make the computers with shallower form factors. This means that more computers can be located in a rack. This has the advantage of increasing the processing density within the racks, and also the advantage of reducing the distance between the computer systems.

However, the form factors are now becoming such that they cannot be reduced significantly further, and there is still an ongoing need to provide increased processing performance at reduced cost.

SUMMARY OF THE INVENTION

One aspect of the invention provides an information processing module comprising an enclosure that encloses a processor subsystem including a processor, memory and a storage device. The information processing module is configured as a field replaceable unit removably receivable in a carrier. The carrier includes at least a power supply module operable to supply DC operating power, a switch module operable to distribute information signals, and a service processor module operable to process system management signals. The information processing module includes an information processing module connector accessible externally to the enclosure and configured to connect with a corresponding information processing module receiving carrier connector on the carrier. The processor subsystem is thereby operable to receive DC power from the power supply module, to communicate information signals with the switch module and to communicate system management signals with the service processor module.

By providing communal services in the carrier, the information processing module can be kept compact and inexpensive. By configuring the information processing module as a field replaceable unit, a faulty information processing module can readily be replaced. Providing an enclosure that fully encloses the information processing subsytem means that the information processing module is robust and that replacement of the faulty unit does not need to be performed by a skilled engineer.

By providing a separate service controller in the information processing module, system management functions for the processor subsystem can be effected without impacting the processing performance of the processor in the information processing module. The service controller is operable to communicate system management signals with the service processor module. A serial interface can, for example, provide for communicating system management signals with the service processor module. One or more Ethernet interfaces can be provided to communicate information signals with the switch module for the distribution of the information signals. Maintenance is facilitated by configuring the information processing module to be hot-swappable.

The information processing modules can have a slab-like form and be configured as blades for side-by-side mounting in a carrier with the connector being located on a narrow end face of the enclosure.

Cooling of the information processing module can be achieved by arranging ventilation openings on the face of the information processing module enclosure on which the connector is located and on an opposing face thereof and providing a fan within the module to force cooling air between the ventilation openings of the opposing faces.

An injector lever mechanism can be provided to facilitate insertion and removal of the information processing module.

A metal or metal coated enclosure can provide electromagnetic interference shielding for the components contained therein. The processor of an information processing module is operable as a server.

Another aspect of the invention provides a carrier that includes a carrier enclosure providing one or more information processing module receiving locations, each location being configured removably to receive an information processing module. The carrier includes one or more power supply modules operable to supply DC operating power, one or more switch modules operable to distribute information signals, and one or more service processor modules operate to process system management signals. Each information processing module receiving location includes one or more information processing module receiving carrier connectors configured to connect to one or more corresponding information processing modules connectors on a received information processing module. The connectors enable the supply of DC power from the power supply module(s) to a received information processing module, communication of information signals between the switch module(s) and the received information processing module and communication of system management signals between the service processor module(s) and the received information processing module.

One or more power supply module receiving locations can be configured removably to receive a field replaceable power supply, each power supply receiving location including power supply receiving carrier connectors configured to connect with corresponding power supply connectors on a received power supply module.

One or more switch module receiving locations can be configured removably to receive a field replaceable switch module, each switch module receiving location including switch module receiving carrier connectors configured to connect with corresponding switch connectors on a received switch module.

At least one service processor module receiving location can be configured removably to receive a field replaceable, service processor module, the switch module receiving location including service processor module receiving carrier connectors configured to connect with corresponding service processor module connectors on a received service processor module.

A connection plane can carry the connectors, the connection plane also carrying conductive paths interconnecting the carrier connectors for carrying power, information signals and system management signals.

The connection plane can form a midplane with the information processing module receiving locations at a first side of the midplane and locations for receiving the power supply module, the switch module and the service processor module at a second side of the midplane. The midplane can be configured as a printed circuit board with conductive paths in the form of tracks on the midplane.

The midplane can include openings configured to permit a flow of cooling air to pass through the midplane.

Another aspect of the invention provides a carrier including a chassis defining a carrier enclosure with a first face and a second face. A connector plane is located inside the carrier enclosure between the first and second faces. A first field replaceable receiving location has an opening in the first face, the connector plane carrying a first connector on a first surface thereof for connecting with a corresponding connector on a field replaceable unit when received in the first field replaceable unit receiving location. A second field replaceable receiving location has an opening in the second face, the connector plane carrying a second connector on a second surface thereof connecting with a corresponding connector on a field replaceable unit when received in the second field replaceable unit receiving location. The connector plane further carries conductive paths interconnecting the first and second connectors.

To improve reliability, the connector plane is passive and does not carry any active components. Further, the midplane can include openings configured to permit a flow of cooling air to pass through the midplane.

A further aspect of the invention provides a carrier comprising a chassis defining a carrier enclosure with a first face and a second face and a passive midplane located inside the carrier enclosure between the first and second faces. A first field replaceable receiving location has an opening in the first face, the connector plane carrying a first connector on a first surface thereof for connecting with a corresponding connector on a field replaceable unit when received in the first field replaceable unit receiving location. A second field replaceable receiving location has an opening in the second face, the connector plane carrying a second connector on a second surface thereof for connecting with a corresponding connector on a field replaceable unit when received in the second field replaceable unit receiving location. The connector plane further carries conductive paths interconnecting the first and second connectors and has ventilation openings to permit a flow of cooling air between the first and second faces.

Each field replaceable unit is provided with an enclosure with openings in opposite faces for the passage of cooling air. Each field replaceable unit further includes a fan unit operable to force cooling air through the field replaceable unit. The openings in the field replaceable units can be arranged to cooperate with the openings in the midplane such that airflow passes between the first and second faces of the carrier via said at least one first field replaceable unit, openings in the midplane and said at least one second replaceable unit, the cooling air being driven by the fans in the field replaceable units. In this manner, the chassis with the carrier plane can be totally passive, with the cooling being provided by the field replaceable units. This provides advantages in terms of cost, reliability and ease of maintenance of the system.

The carrier can be configured as a rack mountable shelf with suitable fixings for mounting the carrier in a racking system. A first face of the carrier enclosure can form a front of the rack mountable shelf and a second face of the carrier enclosure can form the rear of the rack mountable shelf, whereby cooling air can be taken from the front of the shelf and be expelled from the rear of the shelf.

A further aspect of the invention provides a rack mountable shelf configured to support a plurality of field replaceable units in the form of server cartridges that each include at least one server processor, the rack mountable shelf being configured to provide communal services for the server cartridges, including at least one of supplying DC operating power to the server cartridges, distributing information signals between the server cartridges and processing system management signals for the server cartridges.

Each of the server cartridges can be slideably received in a respective one of a series of server cartridge receiving locations arrayed side by side along the front of the shelf. The server cartridges can be configured as thin blades to provide a high server density. For example, 16 server cartridge receiving locations can be provided across the front of the shelf.

The supply of DC operating power to the server cartridges can be provided by one or more field replaceable power supply units (e.g. two redundantly configured power supply units) mounted in the shelf. The distribution of information signals between the server cartridges can be provided by one or more switch units (e.g. two redundantly configured switch units) mounted in the shelf. The processing of system management signals for the information processing modules is provided by one or more field replaceable service processor units (e.g. one service processor unit) mounted in the shelf. Each of the power supply, switch and service processor units can be slideable received in a respective receiving location at the rear of the shelf. A midplane including connectors with conductive paths therebetween can provide power, information signal and system management signal connections between received field replaceable units.

A computer server system can be formed from at least one rack mountable shelf as set out above. Similarly, a rack mounted computer server system can be formed from a rack frame and, mounted in the rack frame, at least one shelf as set out above.

Another aspect of the invention provides method of providing cost effective computer services. The method comprises providing a rack mountable shelf configured to support a plurality of field replaceable units in the form of server cartridges that each include at least one server processor, and providing communal services for the server cartridges in the shelf, the communal services including at least one of supplying DC operating power to the server cartridges, distributing information signals between the server cartridges, and processing system management signals for the server cartridges.

Further aspects and advantages of the invention will become apparent from the following description of particular embodiments.

BRIEF DESCRIPTION OF THE DRAWINGS

Embodiments of the present invention will be described hereinafter, by way of example only, with reference to the accompanying drawings in which like reference signs relate to like elements and in which.

Figure 1:
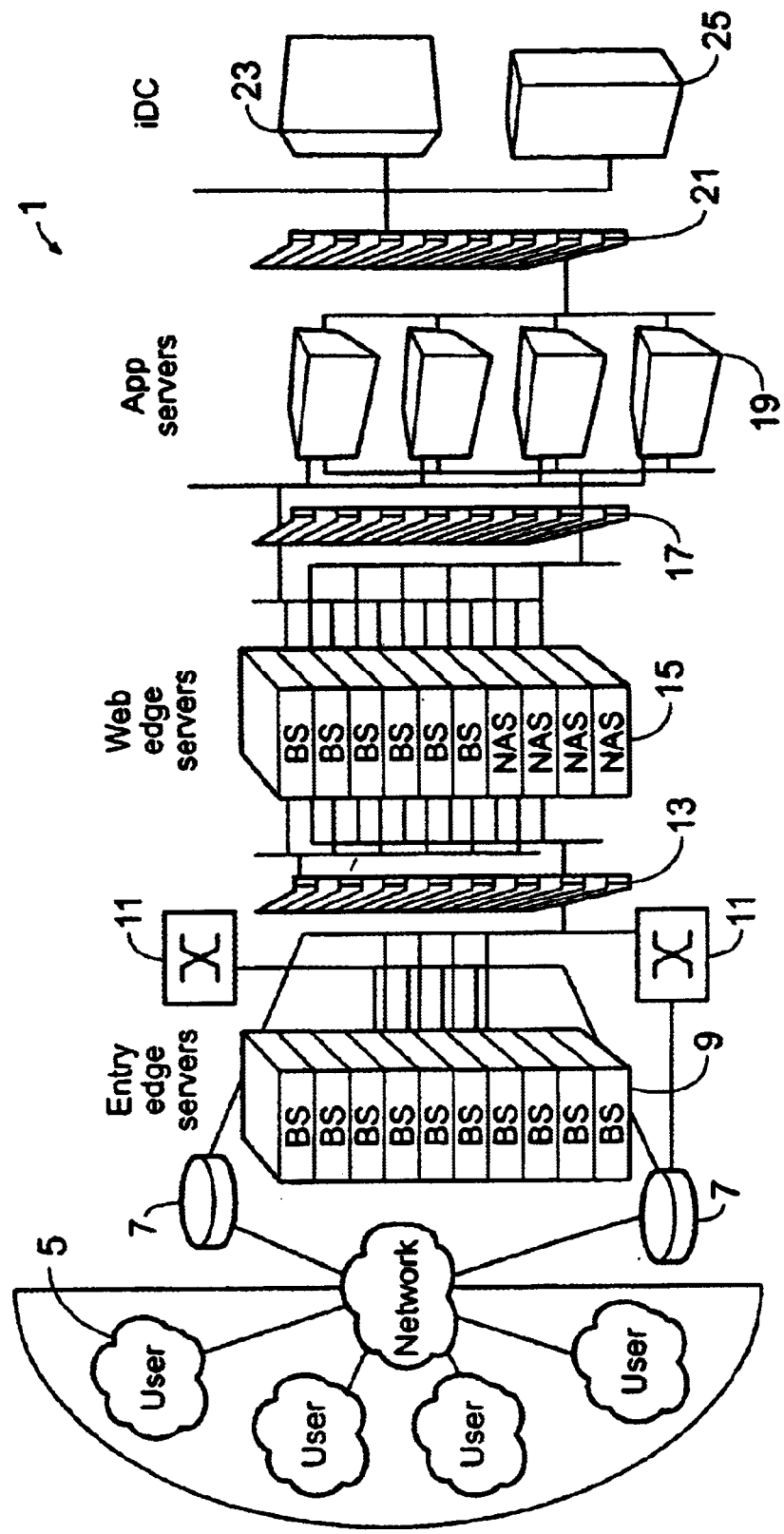
FIG. 1 is a schematic representation of an architecture of a multiprocessor system for supporting a web site.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments of the present invention are described by way of example only in the following with reference to the accompanying drawings.

FIG. 1 is a schematic perspective representation of a rack system 10 as viewed from the front including left and right front uprights 11 and 12 and left and right rear uprights 13 and 14. The uprights are formed with apertures for receiving shelf fixings.

Also shown in FIG. 1 is an example of an embodiment of the invention in which a shelf 20 is mounted in the rack system 10. The shelf 20 forms a carrier configured to carry a plurality of information processing cartridges 40 located side by side along the shelf.

The term "shelf" is used herein in a conventional way to describe a structure that is mountable in rack system 10 and is configured to carry one or more components to form at least a part of a rack-mountable system. In the present example, the shelf 20 is three-dimensional, having a height (H), width (W) and depth (D). In the present example, one dimension (hereinafter or described as the height, H) is smaller than the other dimensions (hereinafter described as the depth, D, and the width, W) to facilitate mounting of the shelf in within the rack system 10. It will be appreciated that although the width and depth are constrained by the dimensions of the racking system for which the shelf is designed, there is more freedom as regard the height, subject to taking account of any appropriate standards and packaging considerations.

Each of the information processing cartridges contains at least one processor. Each information processing cartridge in the present example is operable as a server.

In the embodiment to be described in more detail presently, the information processing cartridges, when aligned in the carrier shelf, look like rectangular slabs, or blades. Accordingly, an information processing cartridge could be described as a blade. Also, as the information processing cartridges in the cartridges are to operate as computer servers in the example of the invention described in more detail presently, an information processing cartridge 20 could also be described as a server blade.

The illustrated example of a shelf 20 is configured to carry sixteen information processing modules, or cartridges 40, each of which is removably mountable in a respective aperture 24 in the front of shelf, whereby the information processing modules can be inserted into and removed from the front of the shelf 20 without removing the shelf 20 from the rack system 10.

The information processing modules 40 in one embodiment of the invention are packaged in an enclosure, or housing, so that the information processing cartridges have the form of a cartridge. Accordingly, in the context of this embodiment, the terms module and cartridge are used interchangeably.

In the present example, the shelf 20 comprises a three-dimensional, generally rectangular, enclosure, or housing, 22 that is suitable for mounting in generic racking systems including both 4-post and 2-post systems. It can be mounted on fixed rigid rack mounting ears and/or simple slide/support system. The present example is designed for standard 19" racking as defined, for example, in the well-known IEC297 and EIA 310 specification standards with height corresponding to the so-called 3U (3 standard unit) height. For mounting such a 3U unit in such a 19" racking system, the enclosure can be arranged with a height of up to about 132.0 mm, a width of up to about 445.0 mm and a depth, including all hardware and fascias, but excluding cable management, of up to about 610.0 mm, with the depth from the front-most point of a fascia to a rear I/O connector panel of a rear mounted Field Replaceable Unit (FRU) of 595.0 mm. Of course, other examples designed for other racking systems could have different dimensions.

The shelf 20 has a single enclosure, or housing, 22 that houses a number of modular units or subsystems, the majority of which are replaceable in the field and are therefore known as Field Replaceable Units (FRUs). These modular units include the information processing cartridges 40.

The shelf enclosure 22 is fabricated from conductive sheet material, for example from steel sheet) to form a chassis portion 21 that includes a base 221, two side walls 222 and 223, a front wall 224 and a rear wall 225. The word "front" as used with respect to the wall is merely used as a label herein to refer to the wall 224 that is located at the main access side of the rack system 10 in use when the shelf is mounted therein. Similarly, the words "rear" and "side" are merely used as herein to refer to the walls 225, 222 and 223 that, in use, are located at those respective positions when the shelf is mounted in the rack system 10.

The apertures 24 are formed in the front wall 224 for receiving the information processing cartridges 40 and, as will be explained later, apertures are also formed in the rear wall 225 for receiving further FRUs. The enclosure further includes a removable top cover 226 that can be secured to the chassis portion 21, for example by one or more screws. The apertures in the front and rear walls 224 and 225 allow at least some of the FRUs to be inserted into and/or removed from the shelf 22 via the front or the rear thereof, as appropriate, without removing the shelf from the racking. Access to components mounted in the shelf that are not accessible via one of the apertures in the front 224 and rear 225 walls can be achieved by removing the shelf enclosure 22 from the racking system 10 and then removing the top cover 226 of the shelf enclosure 22.

Figure 2:
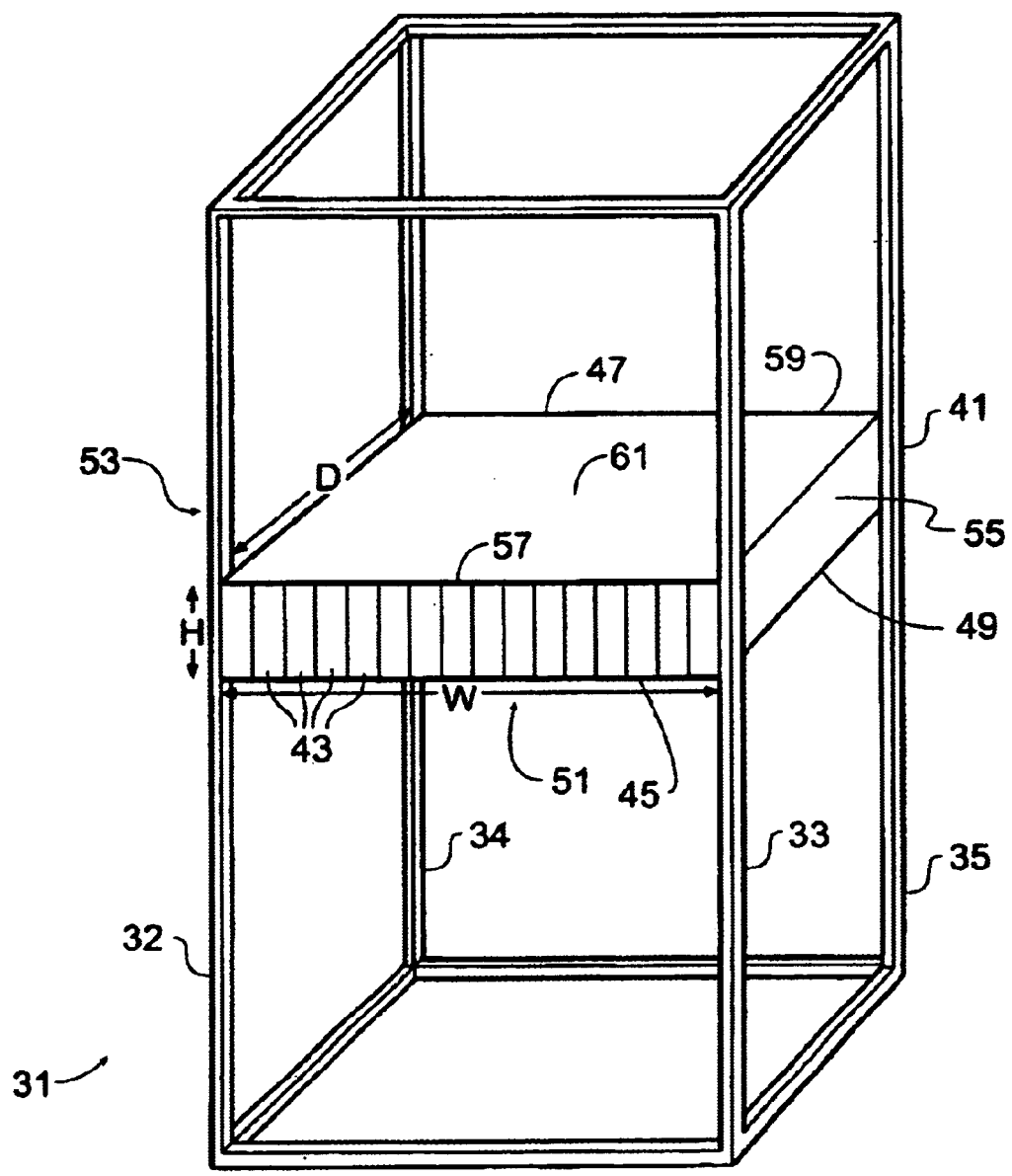
FIG. 2 is a schematic representation of a racking system incorporating an example of a carrier in the form of a rack-mountable shelf according to a first example.

FIG. 2 is a front view of an example of a shelf 20 for an embodiment of the invention. A plastic front bezel 30 is provided that fits on the front wall 224 of the housing 21 of the shelf enclosure 22. The front bezel 30 can be formed as a unitary removable part that spans the whole width and height of the front of the shelf enclosure 22. The front bezel includes a peripheral portion 32 that can provide areas for corporate and product branding marks, for identification and numbering for the information processing cartridge and for a bar code label (all not shown). A central area 34 of the front bezel 30 can be open allowing access to the apertures 24 in the front wall 224 of the shelf enclosure 22 for insertion and removal of the information processing cartridges 40. LED indicators 36 are mounted on a system indicator printed circuit board (not shown) behind a desired area of the bezel to provide an indication of system status via light guides incorporated into the bezel. A further system indicator board (also not shown) carrying LED indicators is provided inside the shelf enclosure to be visible from the rear thereof.

As mentioned above, in the present example of a shelf, up to sixteen information processing cartridges 40 can be installed in respective apertures 24 in the front wall 224 thereof. The number of information processing cartridges actually installed in any installation is dependent upon the system configuration required.

Figure 3:
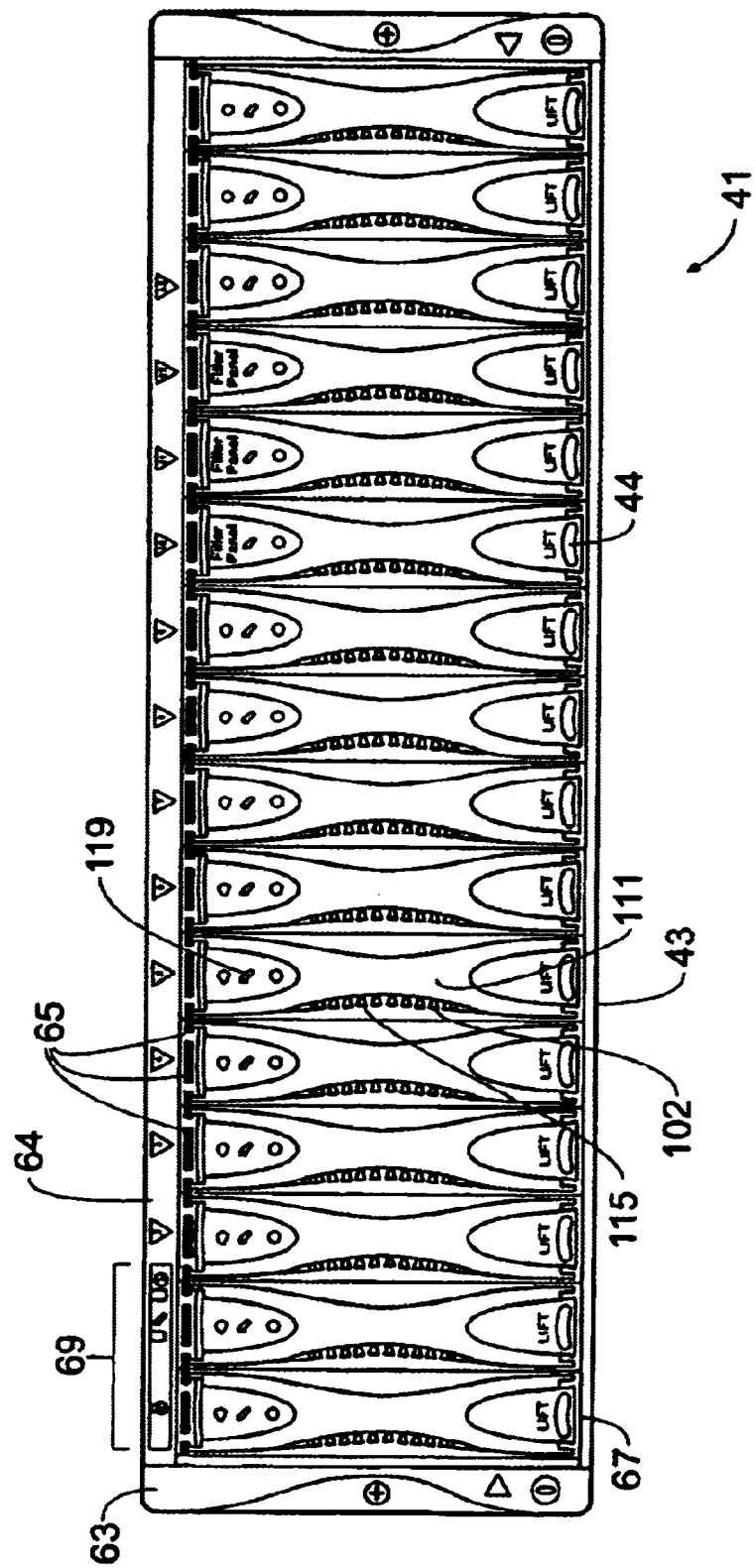
FIG. 3 is a front view of an example of a carrier in the form of a shelf of FIG. 2.

FIG. 3 illustrates the rear of the shelf units of FIGS. 1 and 2. This shows three different types of FRU 50, 60 and 70 (5 units in total) that have been inserted into respective apertures 25, 26 and 27 in the rear of the shelf enclosure 22. The FRUs shown in FIG. 3 include two switches 50, a Shelf Service Processor (SSP) 60, and two Power Supply Units (PSUs) 70.

Before proceeding with a more detailed description of each of the FRUs 40, 50, 60 and 70 introduced so far and of the construction of the shelf 20, there follows a brief description of an information processing cartridge 40, a switch 50, an SSP 60 and a PSU 70 with reference to FIGS. 2, 3, 4, 6 and 7.

Figure 4:
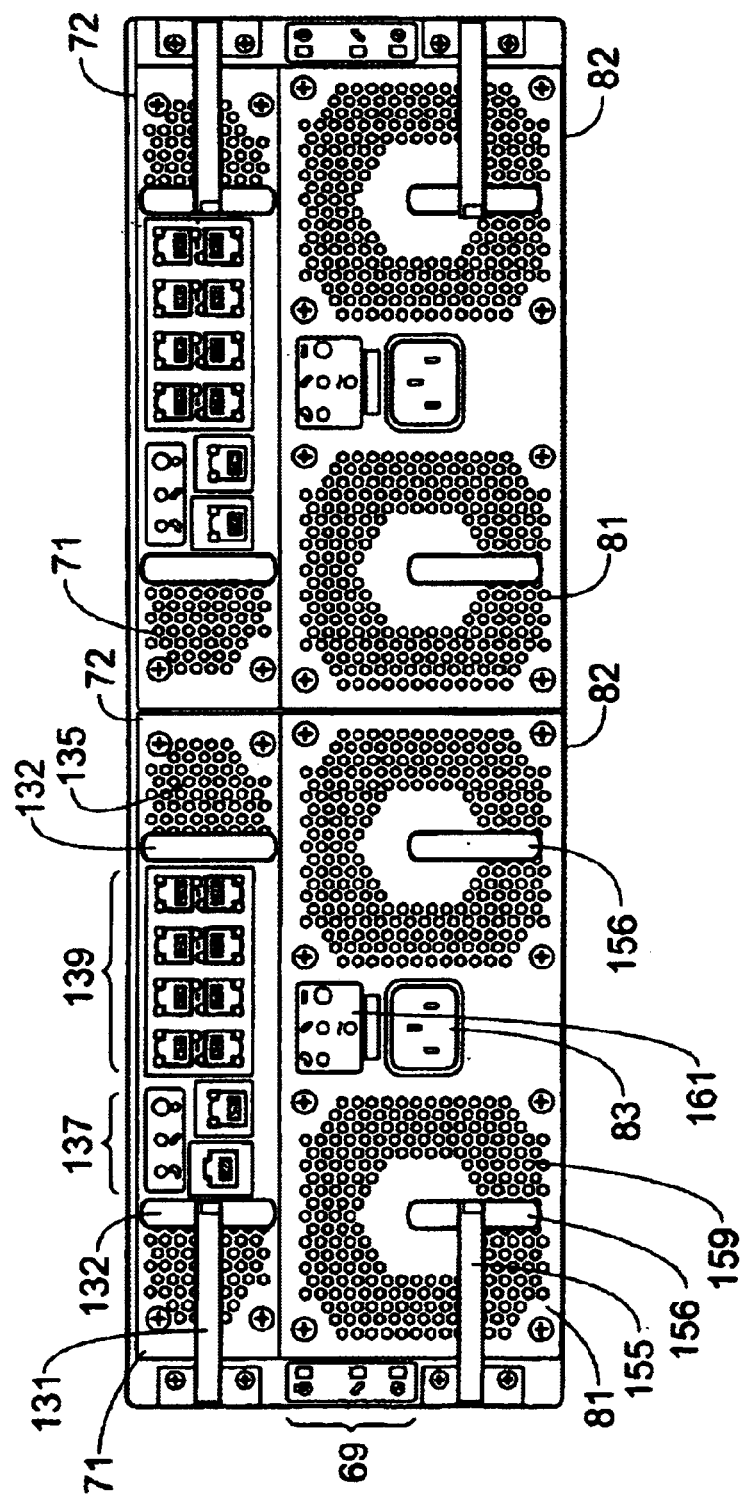
FIG. 4 is a rear view of an example of the shelf of FIG. 2.
Figure 5A:
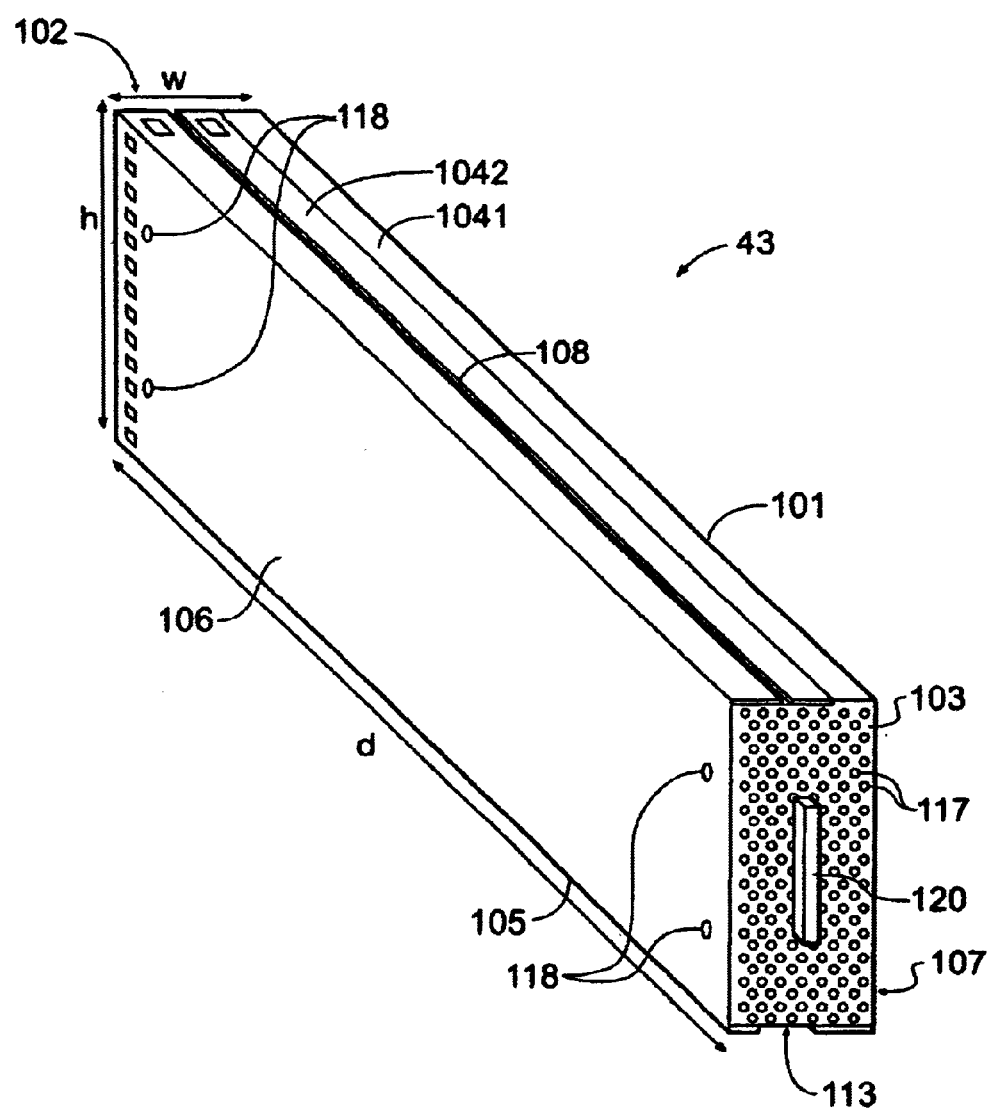
FIGS. 5A, 5B and 5C are schematic perspective views and a schematic exploded view respectively of an example of an information processing cartridge for mounting in the shelf of FIG. 2.
Figure 5B:
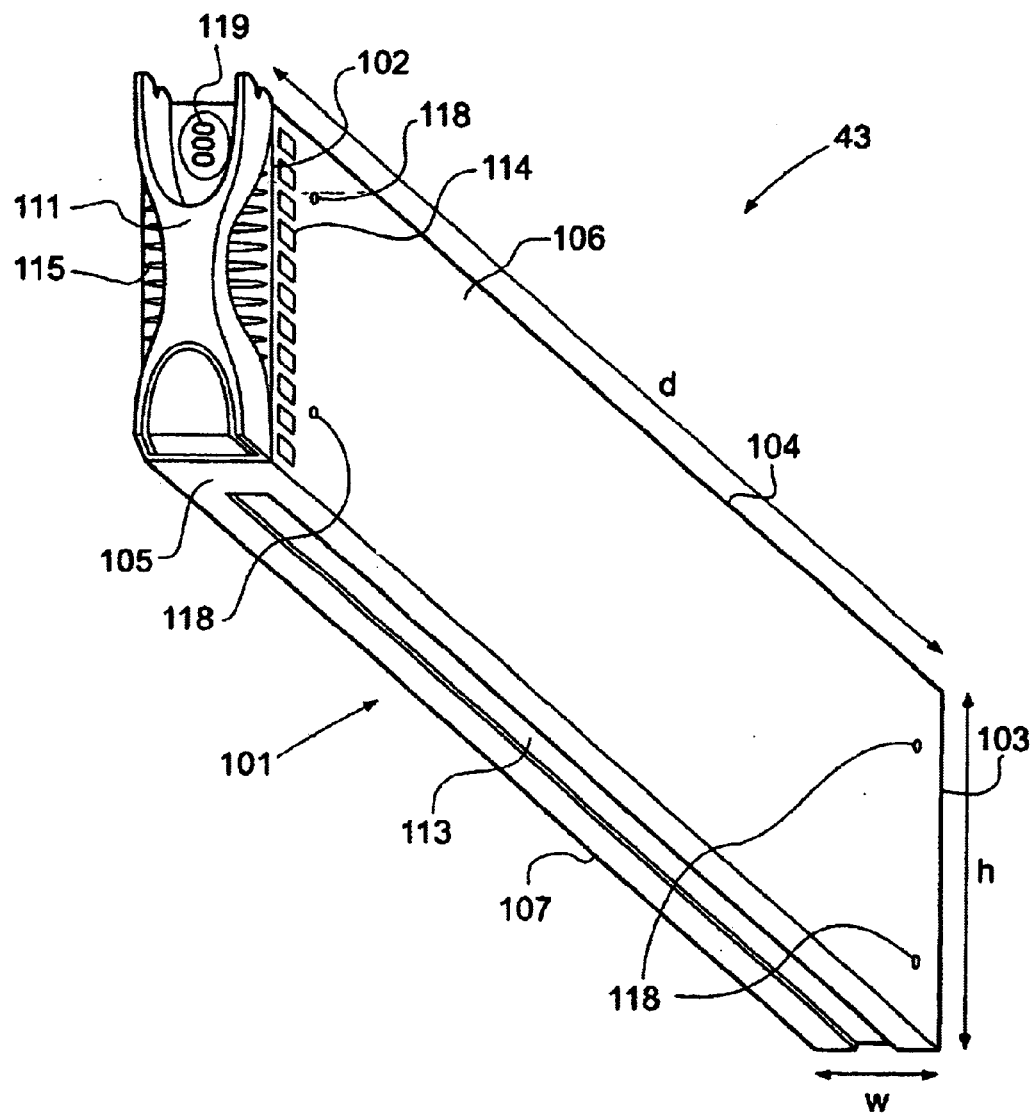
Figure 5C:
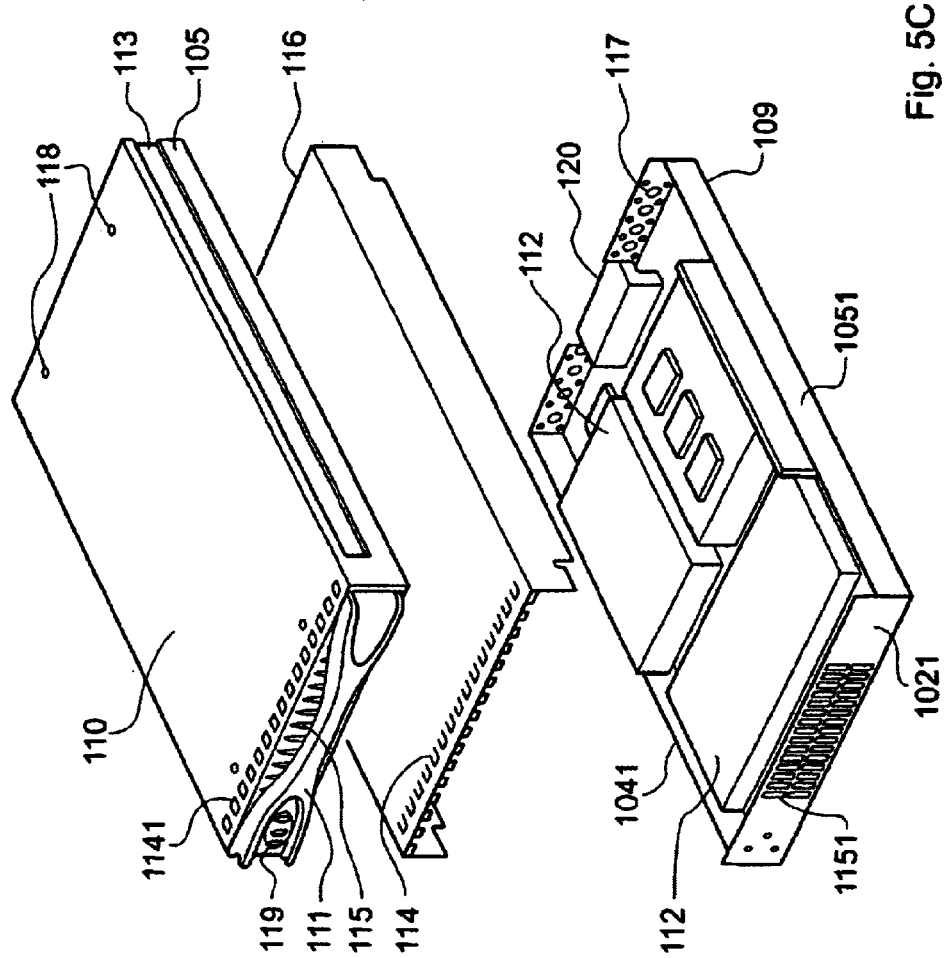
Figure 5D:
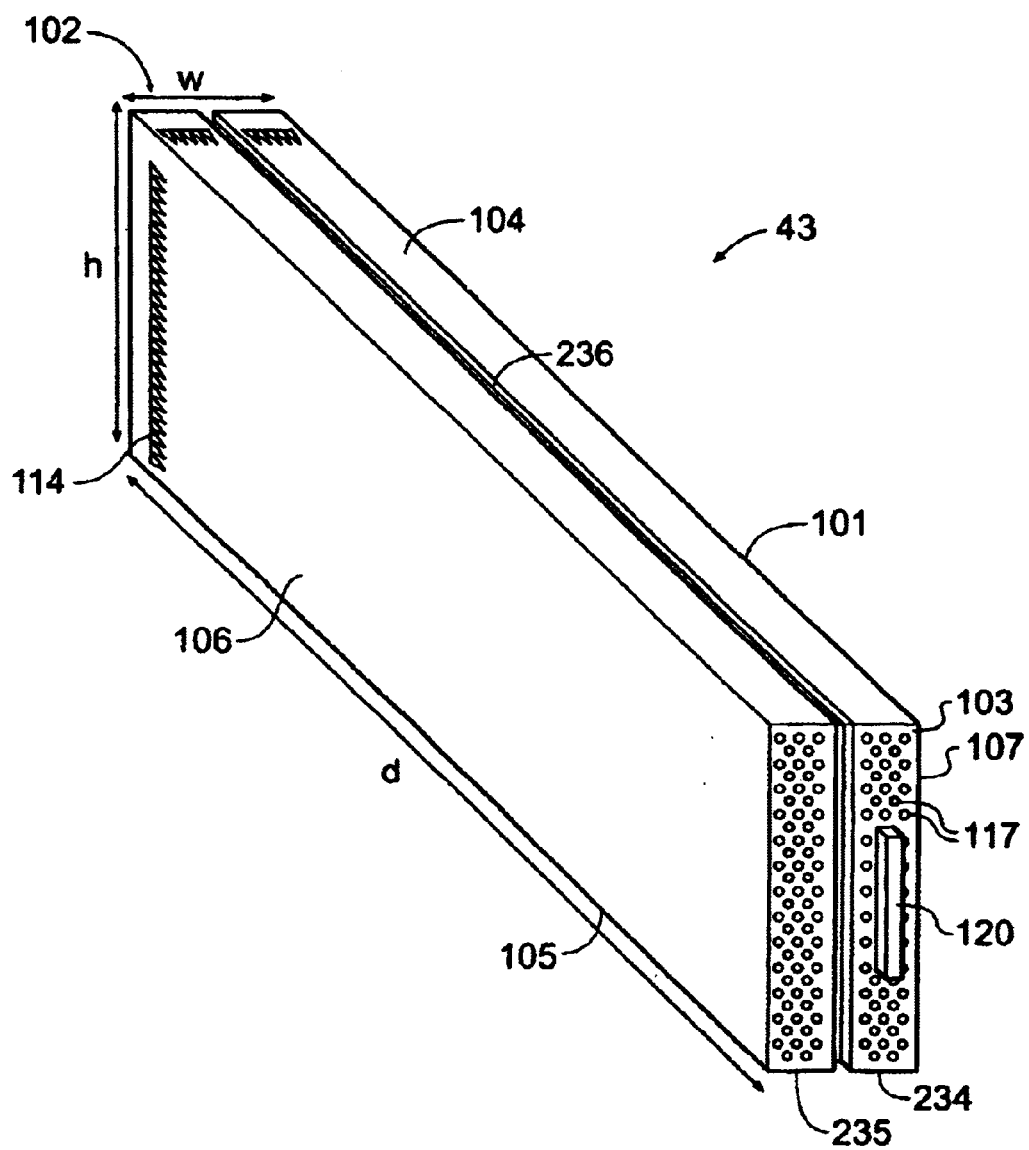
FIG. 5D is a schematic perspective view of an example of an information processing cartridge for mounting in the shelf of FIG. 2.

FIG. 4 provides a perspective view, partly from the rear, of an information processing cartridge 40. Here is it to be noted that the term "rear" is applied in the context of the position, when installed, of the information processing cartridge, with respect to the shelf 20 (i.e. in this case the "rear" of the information processing cartridge 40 is innermost part of the information processing cartridge when it is inserted in the shelf 20.

With reference to FIGS. 2 and 4, it will be noted that information processing cartridges are three-dimensional, having a height (H), width (W) and depth (D). In order to provide for a dense packing of the information processing cartridges in the shelf, at least one dimension (hereinafter described as the width, W) is smaller than at least one other dimension (hereinafter described as the depth, D), and possibly also smaller than the remaining dimension (hereinafter described as the height, H). If, as in the present embodiment, the information processing cartridges are to be arranged in a one-dimensional array (a row) across the shelf, then efficient packing for the information processing cartridges is achieved where one dimension (hereinafter described as the width, W) is smaller than both of the other dimensions (hereinafter described as the depth, D and the height, H).

It will be noted that an enclosure 42 of present example of an information processing cartridge 40 has six, generally rectangular, faces. For convenience only, the face that is visible from the front of the racking when an information processing cartridge 40 is mounted in the shelf 20 is known as the front face 421. The opposite face is known as the rear face 422. In the present example these two faces, as well as top and bottom faces 423 and 424, have the shape of elongate rectangles. The side faces 425 and 426 are also rectangular, but not elongate in the manner of the front, rear, top and bottom faces.

Although in the present example the information processing cartridges have six generally rectangular faces, it will be appreciated that other examples could have other configurations. For example, rather than having a generally rectangular shape, the side faces of another example of an information processing cartridge could have the general shape of a triangle (whereby the information processing cartridge may then only have five faces), a pentagon (whereby the information processing cartridge may then have seven faces), and so on. Indeed, one or more or all of the edges could be curved. However, it will be appreciated that the present configuration provides advantages for example, in terms of manufacturing, engineering and packing density within a shelf 20.

In this example, the information processing cartridge enclosure 42 is fabricated from steel sheet to form a chassis portion that includes one side face 426, the front and rear faces 421 and 422 and the top and bottom faces 423 and 424. A cover portion that is secured to the chassis portion forms the other side face 425. The cover portion is secured to the chassis portion by suitable fixings, for example one or more screws 427. It will be appreciated however, that in another example, the cover portion could be used to form another of the faces, with the chassis portion forming the remaining faces. The provision of the enclosure means 42 that the information processing cartridge 40 can safely be handled by an operator who is not a skilled technician. Also, through the use of the enclosure 42, the information processing cartridge is a robust unit that protects its inner workings from the outside environment and vice versa. The use of a metal enclosure means that the information processing cartridge includes its own electromagnetic shielding. To this end, the enclosure 42 is also provided with EMI fingers 41 to ensure metal contact with the shelf chassis and the adjacent components.

The information processing cartridge 40 incorporates an injector handle 43 on the front face 421 with an associated latch mechanism 435 for facilitating insertion and latching of the information processing cartridge 40 within an aperture in the shelf 20.

The front face 421 of the information processing cartridge 40 is perforated 44 to allow for airflow into the information processing cartridge 40. The rear face 422 of the information processing cartridge 40 is also perforated 46 to allow for air to be exhausted from the rear of the information processing cartridge 40. At least one fan (located behind the perforated portion 46 of the rear face) is provided in an information processing cartridge 40 to channel cooling air through the information processing cartridge from the front to the rear. LED indicates 45 can be provided on the front face 421 of an information processing cartridge to indicate whether power is on, whether service intervention is required and whether the information processing cartridge 40 can be removed. A 40 way SCA-2 connector 47 is provided at the rear of the information processing cartridge 40 for electrical connection of the information processing cartridge 40 within the shelf 20. The connector arrangement could include a guide pin arrangement to prevent module misalignment during insertion of the information processing module into the receiving location.

FIG. 5 provides a perspective view, partly from the front, of a switch cartridge 50. Here is to be noted that the term "front" is applied in the context of the position, when installed, of the switch cartridge 50, with respect to the shelf 20 (i.e. in this case the "front" of the switch cartridge 50 is innermost part of the switch cartridge 50 when it is inserted in the shelf 20).

With reference to FIGS. 3 and 5, it will be noted that a switch cartridge 5 is three-dimensional, having a height (H), width (W) and depth (D). In order to provide for a dense packing of the FRUs in the rear of the shelf 20, the switch cartridge 50 has one dimension (hereinafter described as the width, W) smaller than the other dimensions (hereinafter described as the depth, D, and height, H). An enclosure 52 of present example of a switch cartridge 50 has six, generally rectangular, faces. For convenience only, the face that is visible from the rear of the racking when a switch cartridge 50 is mounted in the shelf 20 is known as the rear face 521. The opposite face is known as the front face 522. In the present example these two faces, as well as top and bottom faces 523 and 524 have the shape of elongate rectangles. The side faces 525 and 526 are also rectangular, but not elongate in the manner of the front, rear, top and bottom faces. Although in the present example the switch cartridges have six generally rectangular faces, as for the information processing cartridge 40 it will be appreciated that other examples could have other configurations.

In this example, the switch cartridge enclosure 52 is fabricated from steel sheet to form a chassis portion that includes one side face 526, the front and rear faces 542 and 541 and the top and bottom faces 523 and 524. A cover portion is secured to the chassis portion forms the other side face 525. The cover portion is secured to the chassis portion by suitable fixings, for example one or more screws 527. It will be appreciated however, that in another example, the cover portion could be used to form another of the faces, with the chassis portion forming the remaining faces. The provision of the enclosure 52 means that the switch cartridge 50 can safely be handled by an operator who is not a skilled technician. Also, through the use of the enclosure 52, the switch cartridge is a robust unit that protects its inner workings from the outside environment and vice versa. The use of a metal enclosure means that the switch cartridge includes its own electromagnetic shielding. To this end the switch enclosure 52 is provided with EMI fingers 51 to ensure metal contact with the shelf chassis and the adjacent components. The outer dimensions of the switch enclosure in the present example are 120 mm high, 44 mm wide and 303 mm deep.

The switch cartridge 50 incorporates an injector handle 53 with an associated latch mechanism (not shown) on the rear face 521 for facilitating insertion and latching of the switch cartridge 50 within an aperture 25 in the shelf 20. The front face 522 of the switch cartridge 50 is perforated 56 to allow for airflow into the switch cartridge 50. The rear face 521 of the switch cartridge 50 is also perforated 53 to allow for air to be exhausted from the rear of the switch cartridge 50. At least one fan (located behind the perforated portion 56 of the front face) is provided in a switch cartridge 50 to channel cooling air through the switch cartridge 50 from the front to the rear. LED indicators 54 can be provided on the rear face 521 of the switch enclosure 52 to indicate whether power is on, whether service intervention is required and whether the switch can be removed. Additional link status indicators are integral to 2×4 stacked RJ-45 connectors 55. Electrical connections 57 are provided at the front face of the switch (i.e. on the face that in use is inside the shelf enclosure 22). Signal connections are provided through a 5-row, 2 mm pitch right angle female connector and power connections are provided through a 3-pin right angle connector. The connector arrangement includes a guide pin arrangement to prevent module misalignment during insertion of the switch cartridge module into the receiving location.

Up to two switches 50 can be mounted at any one time at the rear of the shelf unit in corresponding aperture 25 in the rear wall of the shelf enclosure 22. The number of switches 50 provided in any particular implementation depends upon system configuration and the need, or otherwise, for redundancy.

Figure 6:
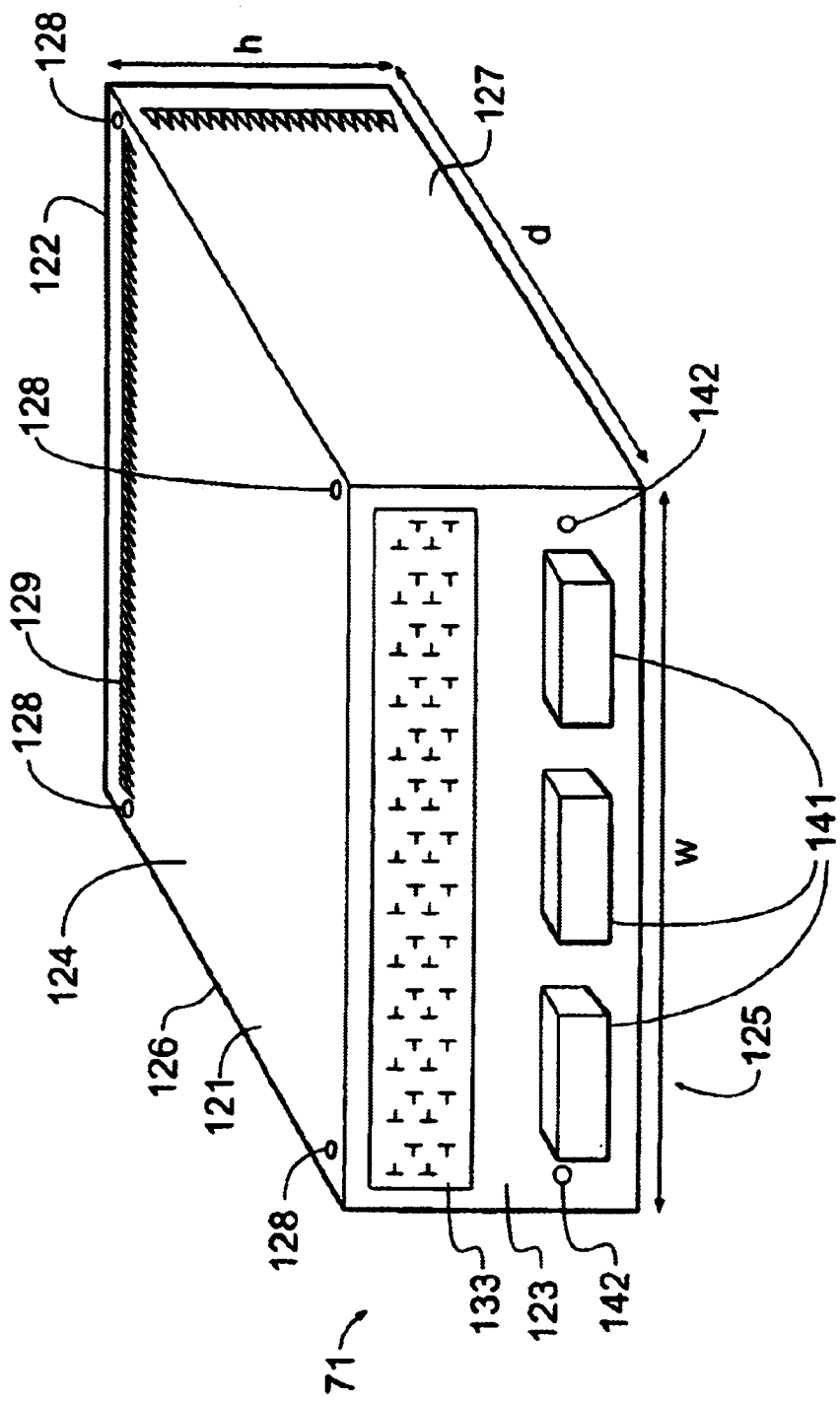
FIG. 6 is a schematic perspective view of an example of a combined switch and service processor module for mounting in the shelf of FIG. 2.

FIG. 6 provides a perspective view, partly from the front, of an SSP cartridge 60. Here is it to be noted the the term "front" is applied in the context of the position, when installed, of the SSP cartridge 60, with respect to the shelf 20 (i.e. in this case the "front" of the SSP cartridge 60 is innermost part of the SSP cartridge 60 when it is inserted in the shelf 20).

With reference to FIGS. 3 and 6, it will be noted that SSP cartridge 60 is three-dimensional, having a height (H), width (W) and depth (D). In order to provide for a dense packing of the FRUs in the rear of the shelf 20, the SSP cartridge 60 has one dimension (hereinafter described as the width, W) smaller than the other dimensions (hereinafter described as the depth, D, and height, H). An enclosure 62 of present example of an SSP cartridge 60 has six, generally rectangular, faces. For convenience only, the face that is visible from the rear of the racking when the SSP cartridge 60 is mounted in the shelf 20 is known as the rear face 621. The opposite face is known as the front face 622. In the present example these two faces, as well as top and bottom faces 623 and 624 have the shape of elongate rectangles. The side faces 625 and 626 are also rectangular, but not elongate in the manner of the front, rear, top and bottom faces. Although in the present example the SSP cartridges have six generally rectangular faces, as for the information processing cartridges 40 it will be appreciated that other examples could have other configurations.

In this example, the SSP cartridge enclosure 62 is fabricated from steel sheet to form a housing portion that includes one side face 626, the front and rear faces 642 and 641 and the top and bottom faces 623 and 624. A cover portion that is secured to the housing portion forms other side face 625. The cover portion is secured to the chassis portion by suitable fixings, for example one or more screws 627. It will be appreciated however, that in another example, the cover portion could be used to form another of the faces, with the housing portion forming the remaining faces. The provision of the enclosure 62 means that the SSP cartridge 60 can safely be handled by an operator who is not a skilled technician. Also, through the use of the enclosure 62, the SSP cartridge is a robust unit that protects its inner workings from the outside environment and vice versa. The use of a metal enclosure means that the SSP cartridge includes its own electromagnetic shielding. The SSP enclosure 62 is provided with EMI fingers 61 to ensure metal contact with the shelf chassis and the adjacent components.

The SSP cartridge 60 incorporates an injector handle 63 with an associated latch mechanism (not shown) on the rear face 621 for facilitating insertion and latching of the SSP cartridge 60 within an aperture 26 in the shelf 20. The front face 622 of the SSP cartridge 60 is perforated 66 to allow for airflow into the SSP cartridge 60. The rear face 621 of the SSP cartridge 60 is also perforated 63 to allow for air to be exhausted from the rear of the SSP cartridge 60. At least one fan (located behind the perforated portion 66 of the front face) is provided in an SSP cartridge 60 to channel cooling air through the SSP cartridge 60 from the front to the rear. LED indicators 64 can be provided on the rear face 621 of the SSP enclosure 62 to indicate whether power is on, whether service intervention is required and whether the SSP can be removed. Electrical connections 67 are provided at the front face of the SSP (i.e. on the face that in use is inside the shelf enclosure 22). Signal connections are provided through a 5-row, 2 mm pitch right angle female connector and power connections are provided through a 3-pin right angle connector. The connector arrangement includes a guide pin arrangement to prevent module misalignment during insertion of the SSP cartridge module into the receiving location.

Figure 7:
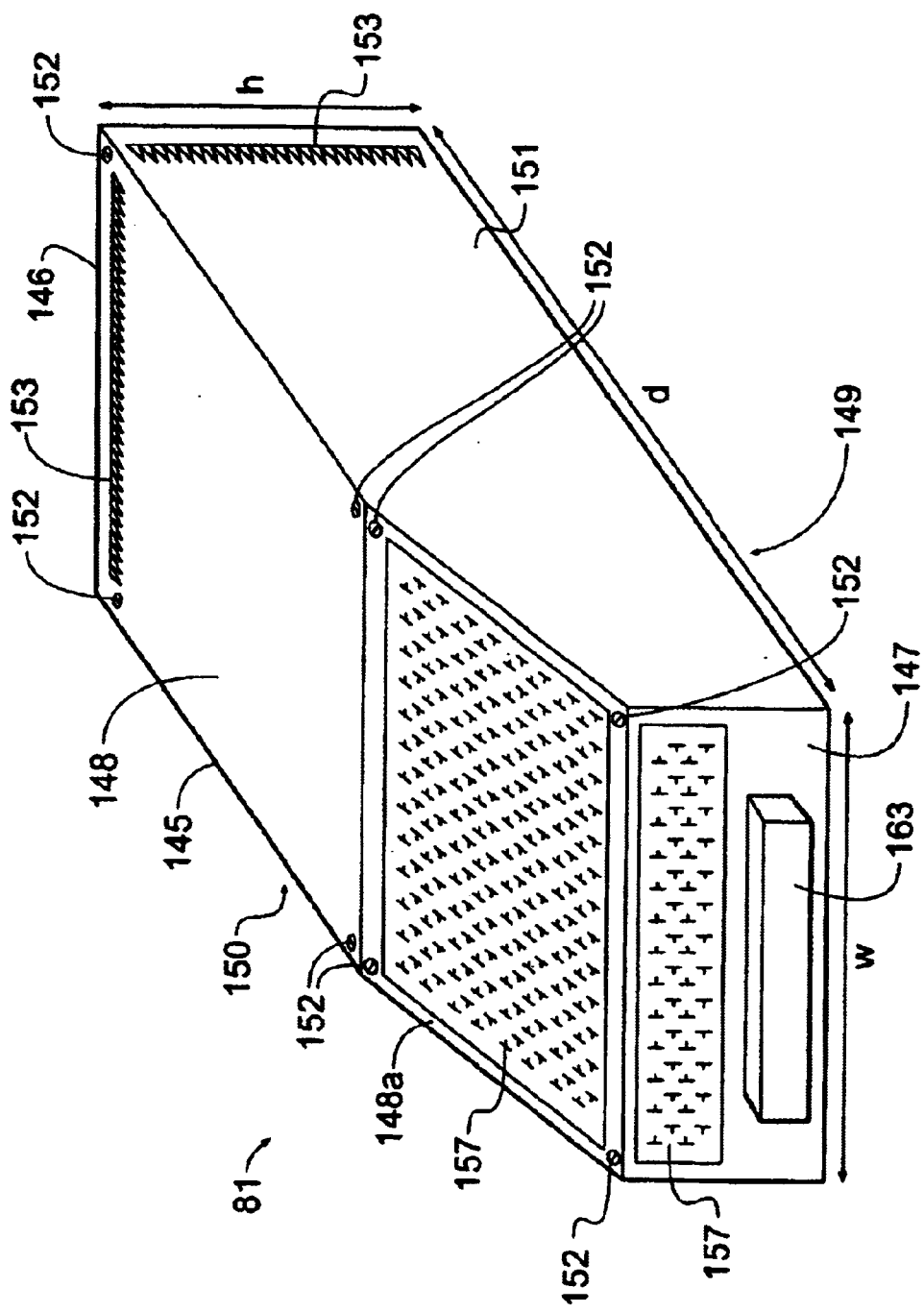
FIG. 7 is a schematic perspective view of an example of a power supply module for mounting in the shelf of FIG. 2.

FIG. 7 provides a perspective view, partly from the front, of a power supply unit (PSU) cartridge 70. Here is it to be noted that the term "front" is applied in the context of the position, when installed, of the PSU cartridge 70, with respect to the shelf 20 (i.e. in this case the "front" of the PSU cartridge 70 is innermost part of the PSU cartridge 70 when it is inserted in the shelf 20).

With reference to FIGS. 3 and 7, it will be noted that PSU cartridge 70 is three-dimensional having a height (H), width (W) and depth (D). In this particular example, the order to provide for a dense packing of the FRUs in the rear of the shelf 20, the PSU cartridge 70 has two dimensions (hereinafter described as the width, W, and the height, H) that are generally similar. An enclosure 72 of present example of a PSU cartridge 70 has six, generally rectangular, faces. For convenience only, the face that is visible from the rear of the racking when the PSU cartridge 70 is mounted in the shelf 20 is known as the rear face 721. The opposite face is known as the front face 722. In the present example these two faces are at least approximately square, give that the width and height of the PSU cartridge are similar, whereas the other faces, although still rectangular, are not, in this example, square. As for the information processing cartridges 40, however, it will be appreciated that other examples could have other configurations.

In this example, the PSU cartridge enclosure 72 is fabricated from steel sheet to form a housing portion that includes the bottom face 724, the side faces 725 and 726 and the front and rear faces 742 and 741. A cover portion that is secured to the housing portion forms the top face 723. The cover portion is secured to the chassis portion by suitable fixings, for example one or more screws 727. It will be appreciated however, that in another example, the cover portion could be used to form another of the faces, with the housing portion forming the remaining faces. The provision of the enclosure 72 means that the PSU cartridge 70 can safely be handled by an operator who is not a skilled technician. Also, through the use of the enclosure 72, the PSU cartridge 70 is a robust unit that protects its inner workings from the outside environment and vice versa. The use of a metal enclosure means that the PSU cartridge includes its own electromagnetic shielding. To this end the PSU enclosure 72 is provided with EMI fingers 71 to ensure metal contact with the shelf chassis and the adjacent components.

The PSU cartridge 70 incorporates an injector handle 73 with an associated latch mechanism (not shown) on the rear face 721 for facilitating insertion and latching of the PSU cartridge 70 within an aperture 27 in the shelf 20. The front face 722 of the PSU cartridge 70 is perforated 76 to allow for airflow into the PSU cartridge 70. The rear face 721 of the PSU cartridge 70 is also perforated 73 to allow for air to be exhausted from the rear of the PSU cartridge 70. At least one fan (located behind the perforated portion 76 of the front face) is provided in a PSU a cartridge 70 to channel cooling air through the PSU cartridge from the front to the rear. LEd indicators 74 can be provided on the rear face 721 of the PSU enclosure 72 to indicate whether input power is good, whether output power is good, whether service intervention is required and whether the PSU can be removed. Electrical connections 77 are provided at the front face of the PSU (i.e. on the face that in use is inside the shelf enclosure 22) for connection to the shelf. The PSU 70 connects to the shelf through a 5P/24S/6P configuration SSI-MPS compliant right angle connector at the front face 722 of the PSU 70. A power inlet 71 for each PSU 70 incorporates a cable/connector retention mechanism on the rear face 721 of the PSU to prevent accidental or malicious removal of the power input cord from the PSU 70.

In the present example, the shelf unit enclosure provides slots at the rear of the shelf unit for two hot-swappable, AC input PSUs 70. To provide redundant power supply, both PSU slots are populated.

If the full complement of information processing cartridges or switches are not fitted to the enclosure, then blanking panels/modules (not shown) are fitted to all unpopulated positions to maintain the correct airflow and thermal characteristics of the shelf, a safe internal operating temperature for the shelf life expectancy of all shelf components, electromagnetic compliance (EMC) containment and electrostatic discharge (ESD) containment.

It will be noted that each of the FRUs, such as the information processing cartridges 40, is contained in its own robust enclosure to facilitate EMC, ESD, handling, storage and transportation. Each FRU is configured as a 'sealed' unit with no field or customer serviceable parts internally. The FRUs are configured to plug into the enclosure and to be hot swappable. The FRUs are keyed to prevent incorrect positioning and insertion into the enclosure and are arranged positively to be retained in the shelf by a latching/locking mechanism.

The FRUs described above are not provided with removable media. Internal data storage is provided by 2.5" IDE 9.5 mm or 12.7 mm profile hard disk drive (HDD) devices (complying to SFF-8201) mounted internally in each information processing cartridge 40 and in the SSP cartridge 60. The drives are not considered as FRUs, and are not hot-swappable disk drives in the present example.

Figure 8A:
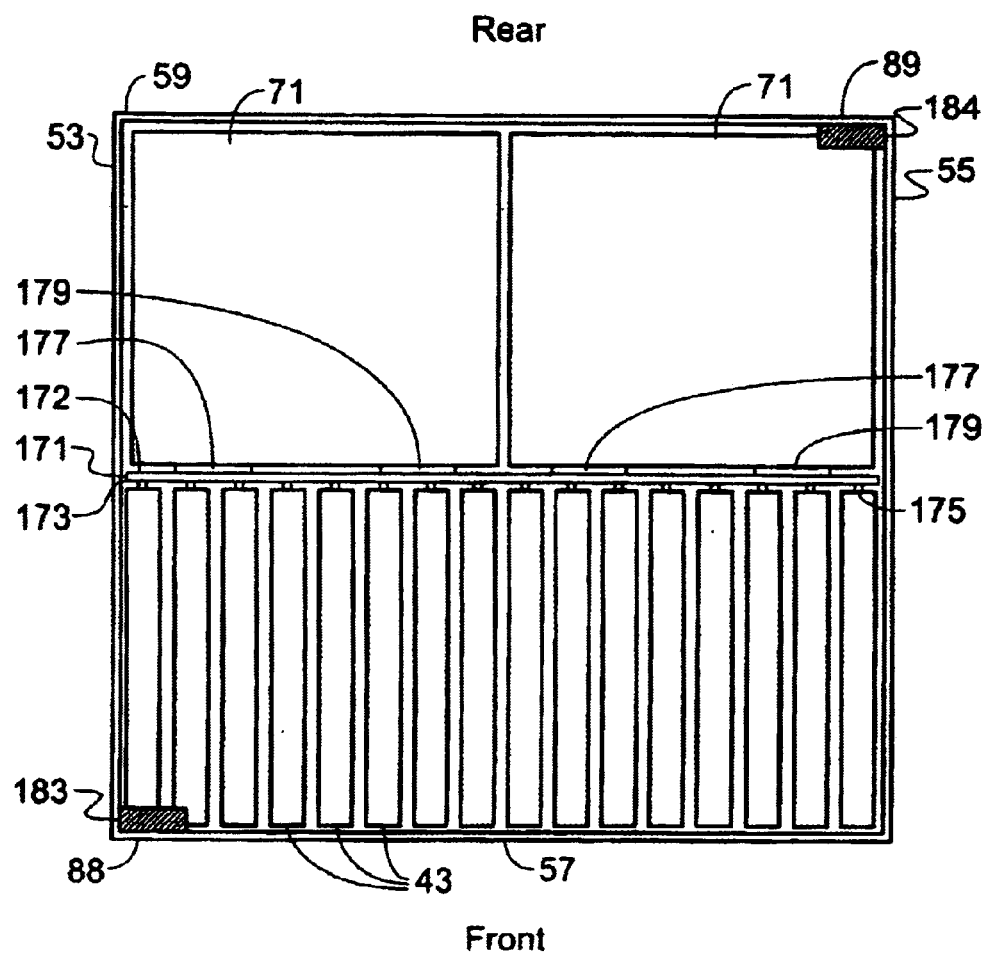
FIGS. 8A, 8B and 8C are a schematic plan view and schematic perspective views, respectively, of an example of the chassis and midplane of the shelf of FIG. 2.
Figure 8B:
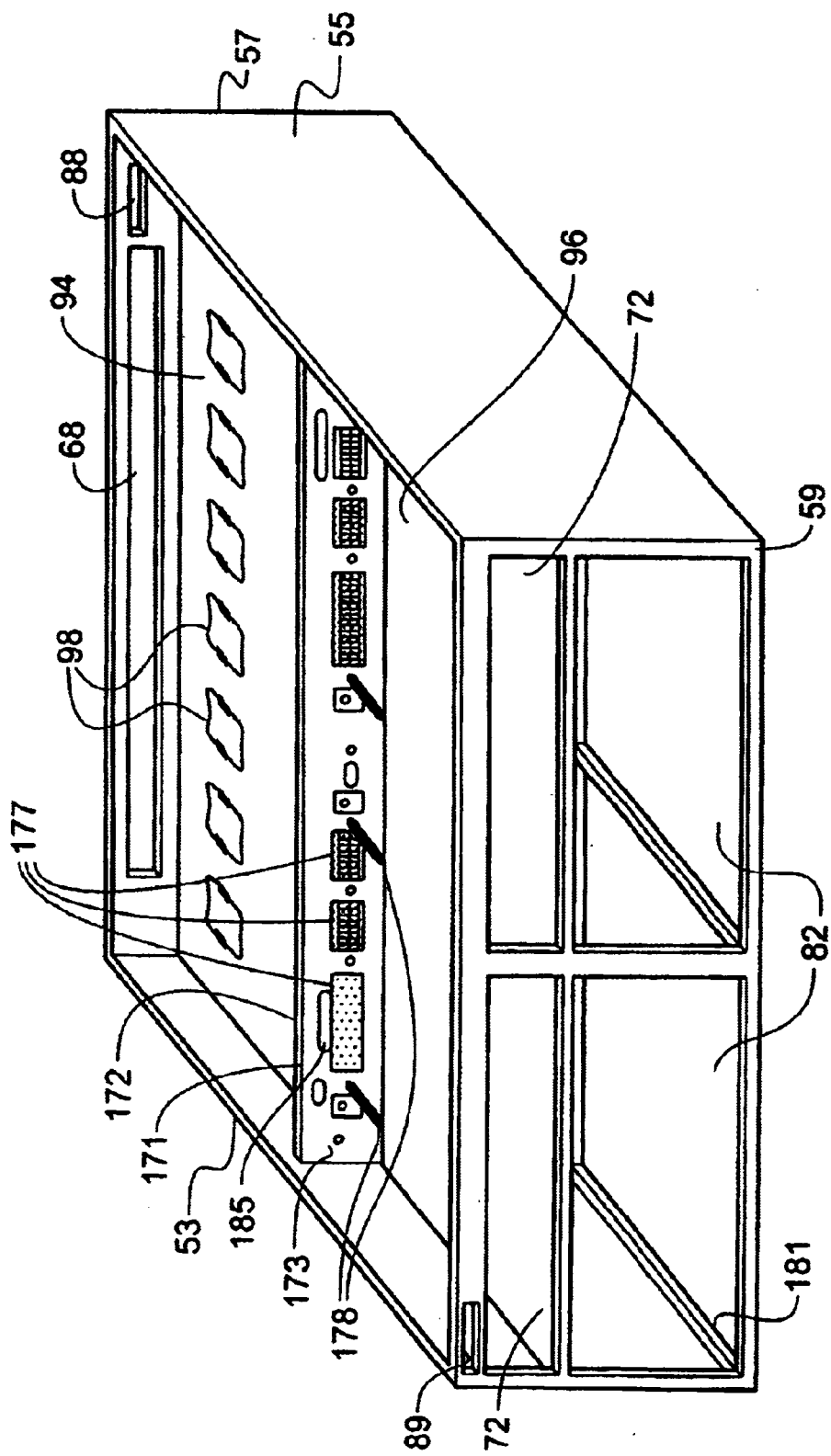
Figure 8C:
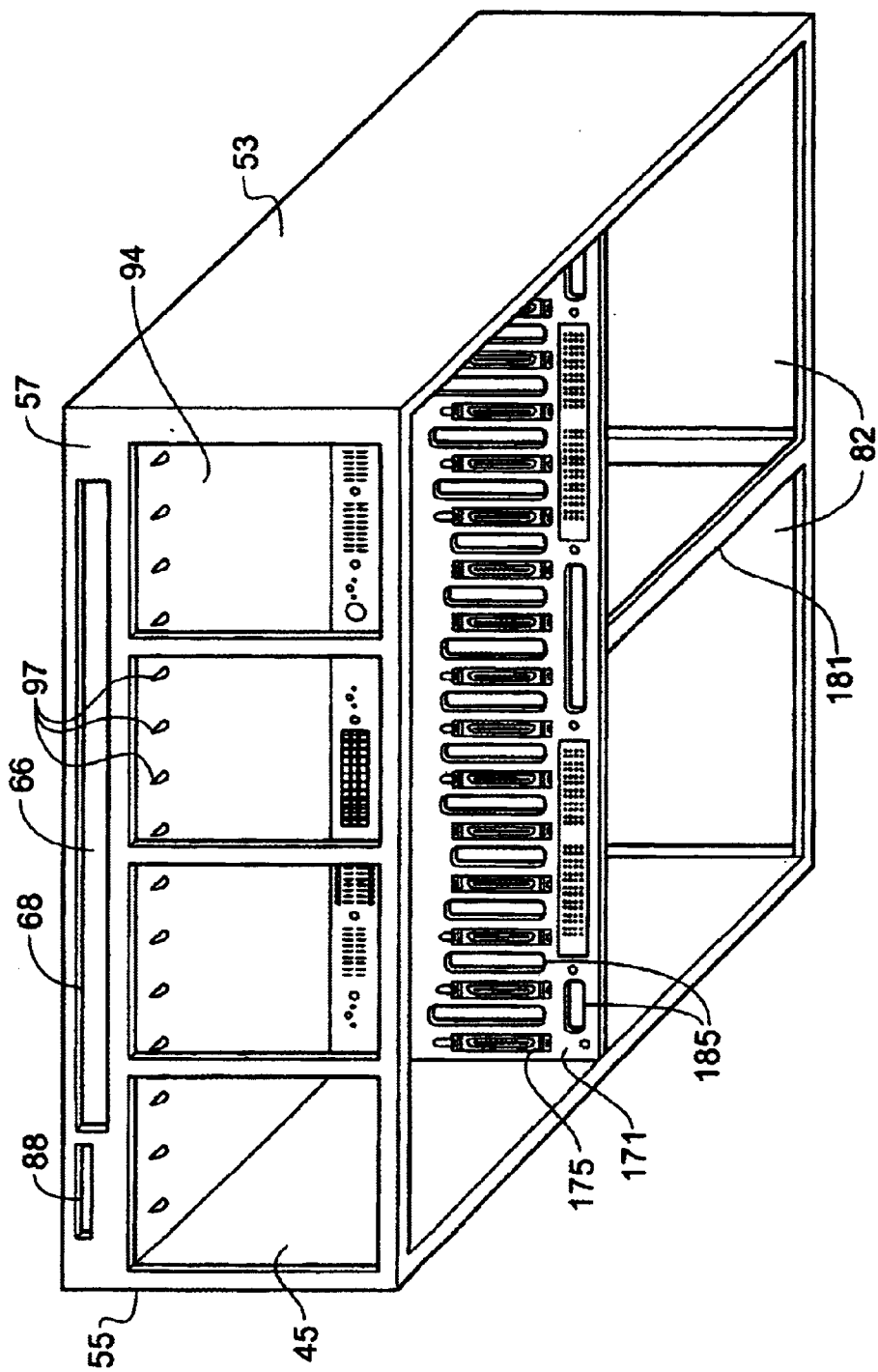
Figure 8D:
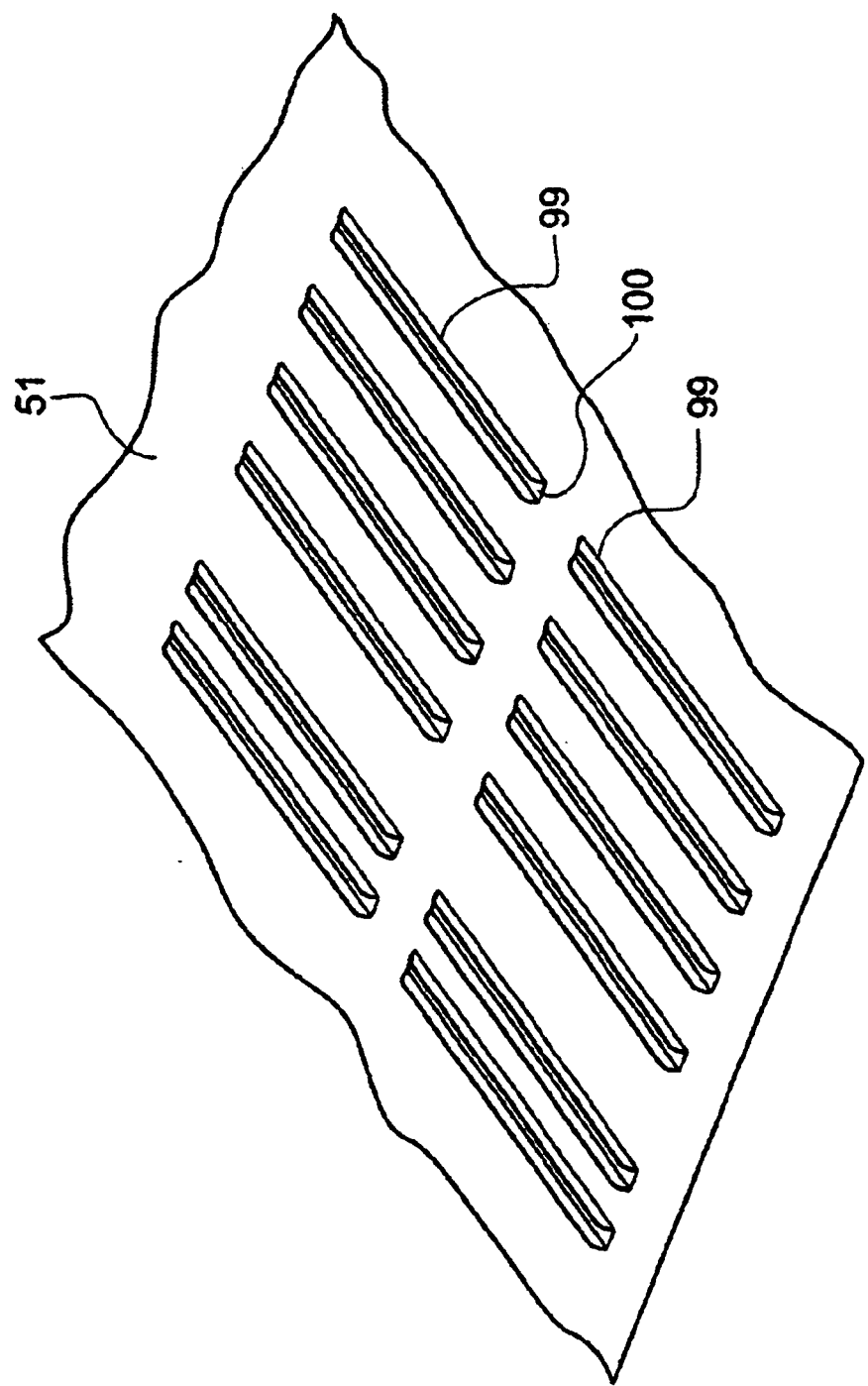

FIG. 8A is a schematic plan view showing the internal configuration of the shelf 20 with the cover 226 removed. FIG. 8B is a schematic perspective view from the rear of the chassis portion 21 of the shelf enclosure with the field replaceable units also removed.

A vertically mounted midplane 80 extends across the shelf 20 and allows for the electrical interconnection of the FRUs. The various apertures in the front and rear walls 221 and 222 of the shelf 20, in combination with the midplane 80, provide guides (e.g., rails 88) and keying e.g., offset connector positioning for the insertion of the FRUs into the enclosure and midplane 80. The midplane 80 is a double-sided printed circuit board (PCB) assembly that is mounted vertically in a rigid manner within the enclosure. It carries connectors 84 on a front surface 81 for making electrical connection with corresponding connectors 47 on the information processing cartridges 40. It also carries connectors 85, 86 and 87 on rear surface 82 for making electrical connection with corresponding connectors 57, 67 and 77 on the switches 50, the SSP 60 and the PSUs 70, respectively. Conductive tacks 83 on and through the misplane 80 interconnect the various connectors. In addition, the midplane provides connectors for receiving corresponding connectors connected to first and second indicator boards 88 and 89 that each carry a respective set of LED indicators 36. The midplane 80 is not regarded as a FRU on its own and is not hot swappable. It is perforated to facilitate airflow through the shelf 20. The midplane 80 includes openings 89, that cooperate with openings in the enclosures of the FRUs 40, 50, 60 and 70, to provide a path for cooling air to pass from the front to the rear of the shelf 20, the cooling air being forced through by fans in the respective FRUs 40, 50, 60 and 70.

There now follows are more detailed description of the midplane 80.

As mentioned above, the midplane 80 connects all the elements of a shelf together, including, in the present example, up to sixteen information processing cartridges 40, up to two switches 50, an SSP 60, two PSUs 70 and the two indicator boards 88 and 89. In the present example, the midplane 80 is only element of a shelf (other than the chassis) that is not hot swappable. Accordingly, to maximize the system reliability, the midplane is configured to provide as a high level of reliability as possible. To this end, the midplane is configured not to include active devices and to include the minimum number of decoupling capacitors consistent with good design practice (ideally zero).

The midplane supports a number of paths (e.g., 83) for various power and signal lines to interconnect the FRUs. It will be appreciated that the signal paths 83 shown in FIG. 8B are merely schematic and that many more such paths are required on or within one or more layers of the midplane 80.

For example each information processing cartridge 40 has a high speed information signal connection (e.g., a Gbit Ethernet SERialiser/DESerialiser (SERDES) connection) to each of the switches 50, each connection consisting of two pairs of differential signals. In a conventional manner therefore, the tracking of the paths for these signals is arranged to keep the pairs well balanced and on a single signal layer (i.e. without vias).

Also, each switch 50 has a lower speed connection (e.g., an 100 Mb Ethernet connection) to the SSP 60. Each connection consists of two differential pairs on the midplane 80. The tracking of the paths for these signals is also arranged to keep the pairs well balanced and on a single signal layer where possible (i.e. without vias). The lines are capacitively coupled rather than using the more common magnetic isolation. There is no requirement for the connection to work at 10 Mb, so the design only need support 100 Mb.

In addition, each information processing cartridge 40 and switch 50 has a serial console connection to the SSP 60. Each connection consists of two TTL level signals that make a transmit and return (TX and RX) pair.

Also, each PSU 70 and switch 50 has a management signal connection (e.g., a serial I2C connection) to the SSP 60 to control power and monitor environmental parameters. The I2C bus consists of two signals SCL and SDA. In addition, an I2C address programming pin is provided for the PSUs 70 and switches 50.

Identification information (FRU ID) for the midplane 80 is held on an I2C electrically erasable programmable read only memory (EEPROM) 90 in the front indicator board 88. In addition to the I2C signals, the SSP 60 provides a current limited supply to the indicator boards 88 and 89 via the midplane. The indicator boards 88 and 89 is also provided with an I2C address programming pin. Depending on the implementation, a FRU ID EEPROM 90 may also be available on the rear indicator board 89.

Each information processing cartridge 40, switch 50 and PSU 70 signals to the SSP 60 that it is inserted by pulling to GND a respective inserted_signal. These signals are fed to the SSP 60 via the midplane 80.

Each PSU 70 has five 12 Volt output rails. The routing from each PSU 70 is arranged so that a fault in any single FRU cannot completely interrupt the power to any other.

As mentioned above, the midplane 80 is provided with appropriate connector arrangements for receiving the connectors on the FRUs.

The information processing cartridge 40 connects to the midplane 80 through a 40 pin SCA-2 connector. Accordingly, the midplane cares corresponding connectors 84.

Each switch 50 connects to the midplane 80 through a right-angle 40 pair connector. The corresponding connectors 85 on the midplane are straight male parts with a power connector. A guide pin arrangement is provided in addition to the connectors to prevent misaligned modules causing bent pins during insertion. A power module is used to provide connection between the power rails. The center pin is longer on the switch modules to provide a leading ground.

The SSP 60 connects to the midplane 80 through a right-angled 125 way 5 row 2 mm connector. The connector 86 on the midplane 80 is a straight male part. A guide pin arrangement is provided in addition to the connectors to prevent misaligned modules causing bent pins during insertion. The same power connectors as used on the switch interconnection may be used, or alternatively spare pins on the 2 mm connector may be used for the 12V power.

Each PSU 70 connects to the midplane 80 through an SSI "MPS" specification connector. The contacts are configured 5P/24S/6P with sequenced signal and power "pins". Where the connector on the PSU is a 1450230-1 R/A male header, solder tails connector, the mating connector 87 on the midplane can be a 1450540-2 vertical receptacle, press-fit connector.

In the present implementation, the indicator boards 88 and 89 (see FIG. 8A) are identical at the front and rear of the system and are configured as FRUs. They hold three system-level indicator LEDs 36 and a FRU-ID PROM 90 each. Three LEDs 36 are present on the indicator board. There is a white locator LED that can be switched by the user for locating the system; a green power-on LED to indicate when the system is powered; and a red service-required LED to indicate a fault or other condition requiring servicing. They are all driven by the SSP 60.

As the FRU-ID for the midplane 80 is held on the indicator boards 88 and 89, so that the midplane can be a totally passive unit. As, in the present example, the front and rear indicator boards are identical, one FRU-ID PROM is available on each board. The FRU-ID PROMs communicate with the System Service processor (SSP) via an I2C bus. Each device on the bus has a separate I2C address. The lower three I2C address bits of the EEPROMs used are available as pins on the device, to allow programming with resistors. The least significant bit of this address (A0) is passed to the midplane via the corresponding connector. This allows the midplane 80 to program the address of the FRU-ID differently for the front and rear indicator boards 88 and 89, by pulling the address low for the front board and high for the rear indicator board 89. This ensures that both EEPROMS are available on the bus, at different addresses. The FRU-ID for the midplane can be stored on either front or rear EEPROMS 90, but the SSP 60 is configured to use the EEPROM 90 on the front indicator board 88. The EEPROM is at least 8 kByte in size.

As mentioned above, the midplane 80 includes openings 89 to provide a ventilation path for cooling air passing through the shelf 20. The cooling air is forced through the shelf 20 by means of fans provided in each of the information processing modules 40, the switch modules 50, the service processor module 26 and the power supply modules 27. The openings 89 shown in FIG. 8B merely form schematic representations of openings in the midplane 80. In practice, the openings could have any form (i.e., a series of large openings, or a number of small perforations), arranged on the midplane to align with corresponding openings or ventilation apertures in the various field replaceable units 40, 50, 60 and 70. In this way, the path of the airflow from the front of the shelf to the back of the shelf can be configured to be as efficient as possible, depending on the detail configuration of the fan units and the ventilation openings or apertures in the information processing, switch, service processor and power supply unit modules 40, 50, 60 and 70. Providing the fan units in the field replaceable units 40, 50, 60 and 70, contributes to the aim of maintaining the chassis 21 and the midplane 80 of the shelf 20 free of active components, thereby minimising cost, and facilitating maintenance. Also, by providing the fan units in each of the field replaceable units, merely inserting and removing field replaceable units automatically adapts the flow of cooling air to the number and type of field replaceable units inserted in the shelf 20.

Figures 9A, 9B, 9C:
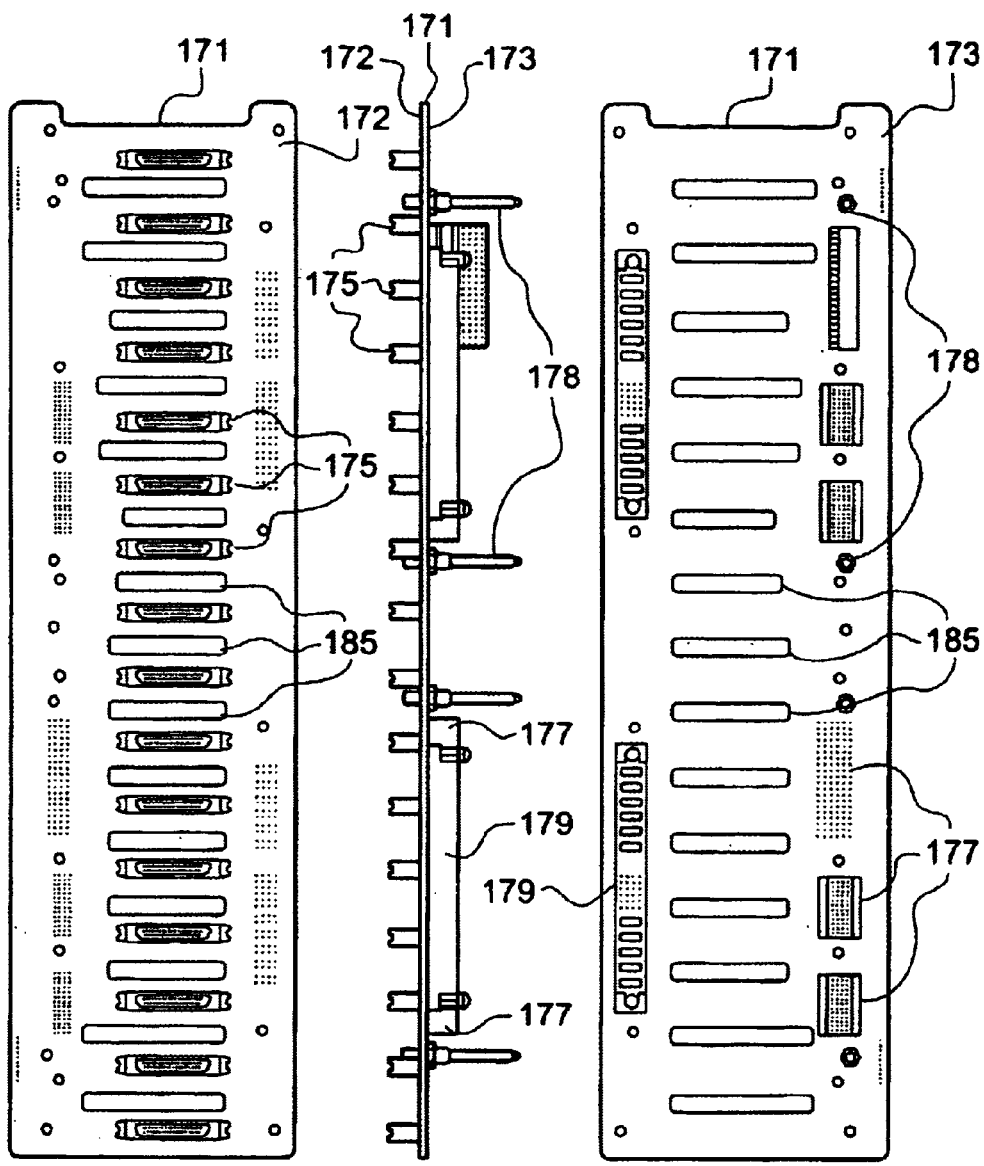
FIGS. 9A, 9B and 9C are schematic front, top and rear views, respectively, of an example of a midplane of the shelf of FIG. 2.

With reference to FIG. 9, there now follows a description of functional elements of an information processing cartridge 40 as contained within the information processing cartridge enclosure 42.

The information processing cartridge 40 includes a microprocessor 412 (in the present example an UltraSPARC processor). The microprocessor is mounted on an information processing cartridge motherboard 410.

A configurable clock generator 414 is implemented as a programmable clock synthesizer employing a crystal is used to produce CPU clock signals, CLKA and CLKB. The clock frequency is determined by jumper settings (not shown). A vectored interrupt controller (I-Chip) 416 and a configurable core voltage regulator module (VRM) 418 are provided.

Two sockets on a riser card from the information processing cartridge motherboard 410 are provided for buffered PC133 dual in line memory modules (DIMMs) 430 with a 72-bit data path with error correction codes (ECC). The memory capacity can be chosen to suit the processor addressable memory space. For example, up to 4 GB of addressable memory can be provided. Serial Presence Detect (SPD) auto-configuration is provided via an SMBus over an I2C bus 432.

A PCI bus architecture is employed with a so-called SouthBridge bus bridge 436 with SuperIO and two Gb Ethernet MAC devices. A 32bit PCI bus 434 is provided from the microprocessor 412. In other examples other bus protocols (e.g., Infiniband) could be used. The SouthBridge 436 is a standard form of bus bridge packaged in a 352 pin PBGA package that provides the following functions:

an SM Bus interface over the I2C bus 432 for access to the SPD (Serial Presence Detect) feature of the DIMMs that allows intialization of the memory controller;

an Xbus interface for access via an Xbus 437 to a EEPROM, a real time clock 440 and an information processing cartridge service controller (hereinafter termed a Blade Service Controller (BSC)) 442;

an IDE interface that provides an ATA-100 IDE connection 444 to an IDE disk drive 446; and a serial console interface on a service bus 448 to the BSC 442 that is used for operating system functions including a console function, this connection being provided without any buffering other than series resistors (not shown).

For IO to the midplane 80, two AC-coupled Ethernet interfaces 450 and 452 are provided, these are packaged in a 316 pin PBGA. These Ethernet interface are operable to provide a PCI attached Ethernet MAC with PCS functionality, capable of operation up to Gigabit Ethernet performance. The physical layer is implemented using SERialiser/DESerialisers (SERDESs) 454 and 456. The SERDES uses differential PECL TX+/− and RX+/− pairs to communicate over the midplane 80. The RX+/− pairs are AC coupled the information processing cartridge 40, the TX+/− pairs are AC coupled at each switch 50. This facilitates hot-swap of the information processing cartridges 40 and the switch(es) 50.

An asynchronous serial connection 457 for communication between the BSC 442 and the SSP 60 is provided.

Internal data storage is provided by an UltraDMA100 ATA hard disk 446 with a capacity of 30 GB or more rated for 24/7 continuous operation. The hard disk 446 is accessed using the primary IDE interface of the SouthBridge 436. The hard disk 446 can hold an operation system, for example a Solaris operating system, and other software and data for performing information processing using the main, or host, processor (CPU) within the information processing module 40.

In the present implementation, the BSC 442 is implemented as a microcontroller, specifically a Hitachi H8S/

2148 microcontroller, part number HD64F2148AFA20. The BSC 442 provides various functions, including:

- dual access (for information processing cartridge and SSP) to EEPROMs 458, 460 for boot information and a FRU-ID for the information processing cartridge;
- channeling communication between an information processing cartridge 40 and the SSP 60;
- control of power on reset (POR), system reset and XIR to the microprocessor 412;
- control of the power, service-required and ready-to-remove LEDs 36;
- upgrading of field-upgradable firmware, via the serial interface;
- a watchdog function for the operating system;
- monitoring the speed of a CPU fen 462; and
- communications with a PROM 464 and the operating system via the Xbus 436.

The BSC 442 is powered by a 5V service bus (SB) rail as soon as the SSP 50 is fully inserted into the midplane 80, it then turns on the rest of the DC/DC converters to provide power to the remainder of the information processing cartridge. A BSC reset signal is derived from a simple conventional power on reset (POR) generator that monitors the 5VSB rail.

A 1 MByte Flash PROM 446 is provided. A 16 kByte I2C EEPROM 458 that is accessible via the BSC 442 contains BSC variables and boot variables. The EEPROM is nominally divided into 8 kB for the boot variables and 8 kB for the BSC variables. Write protection is implemented by BSC firmware. FRU-ID variables arm stored in a second 16 kByte I2C EEPROM 460, accessible via the SouthBridge SM Bus port over the Xbus 437. The EEPROM 460 contains 16 kB for FRU-ID of which the upper 2 kBytes is write protected. The write protection is also implemented by the BSC firmware.

An environmental monitor sensor 466 monitors the CPU and ambient temperatures. This sensor is accessible via the onboard I2C bus from the BSC.

The information processing cartridge 40 is powered from two, diode commoned, 12V supplies 468 and 470. DC/DC converters 472 are used to provide the voltage levels required by the information processing cartridge 40. The DC/DC converters 472 are supplied by dual 12V inputs 468, 472, individually fused 474, 476 and then diode commoned 478, 480. Two voltage sense circuits 482 are provided after the fuses and before the diodes, to prevent a latent fault caused by a failed fuse going undetected until one of the supplies is removed. These circuits are configured to withstand an overvoltage at their inputs whilst the input they are feeding is not powered, without any leakage to the unpowered circuit. A 5V DC/DC converter is turned on as soon as the FRU is fully inserted, but only the BSC 442 and required portions of the SouthBridge 436 are powered (the 5VSB rail). A FET is used to gate off the main 5V supply to the rest of the information processing cartridge 40. The DC/DC converter outputs and the main 5V FeT do not turn on until the BSC 442 turns them on via a signal from the SouthBridge 436. The SouthBridge 436 is used so that if the BSC 442 is reset (by a watchdog timeout or after a firmware download) the state of the DC/DC converters is not affected. When the remaining outputs from the converters 472 are within specifications a PWR_GOOD signal is asserted low to the BSC 442.

A SouthBridge resume circuit runs from 3V3 so a simple Zener diode dropper circuit is used to generate 3V3 from the 5VSB supply.

When the FRU is inserted the inrush current is limited to <1 A and the rate of rise is configured not to exceed 20 A/s to provide a so-called soft start to facilitate hot-insertion. The intent is to prevent damage to the connectors and to avoid generating noise. A soft start controller, which controls a ramping-up of voltage levels, is enabled when the INSERTED_L signal is asserted low, this signal is on a short pin in the connector and is connected to GND through the midplane 80.

The processor fan 462 runs at full speed to minimize the temperature of the information processing cartridge 40 and the fan. The speed of the processor fan and sink is monitored by the BSC 442, using a tachometer sense pin on the H8 microcontroller. In the event of the fan speed falling below 80% of its nominal speed, the BSC 442 can be arranged to issue an alert. The nominal speed of the fan is recorded as part of the BSC EEPROM contents.

The midplane connector 47 for the information processing cartridge 40 establishes the connection between the switch FRU and the midplane. It supports up to 84 connections (pins) that will deliver SERDES outputs 492, 494, I2C signals 496, and power 498, 499. Signal connections may be made through a right-angled connector. Power connections are made through a 3 information processing cartridge right-angled connector. The connector is configured to facilitate hotswapping of the information processing cartridge with a low insertion force. The connector also uses guide pins to increase the ease of serviceability and prevent module misalignment during insertion.

Figure 10:
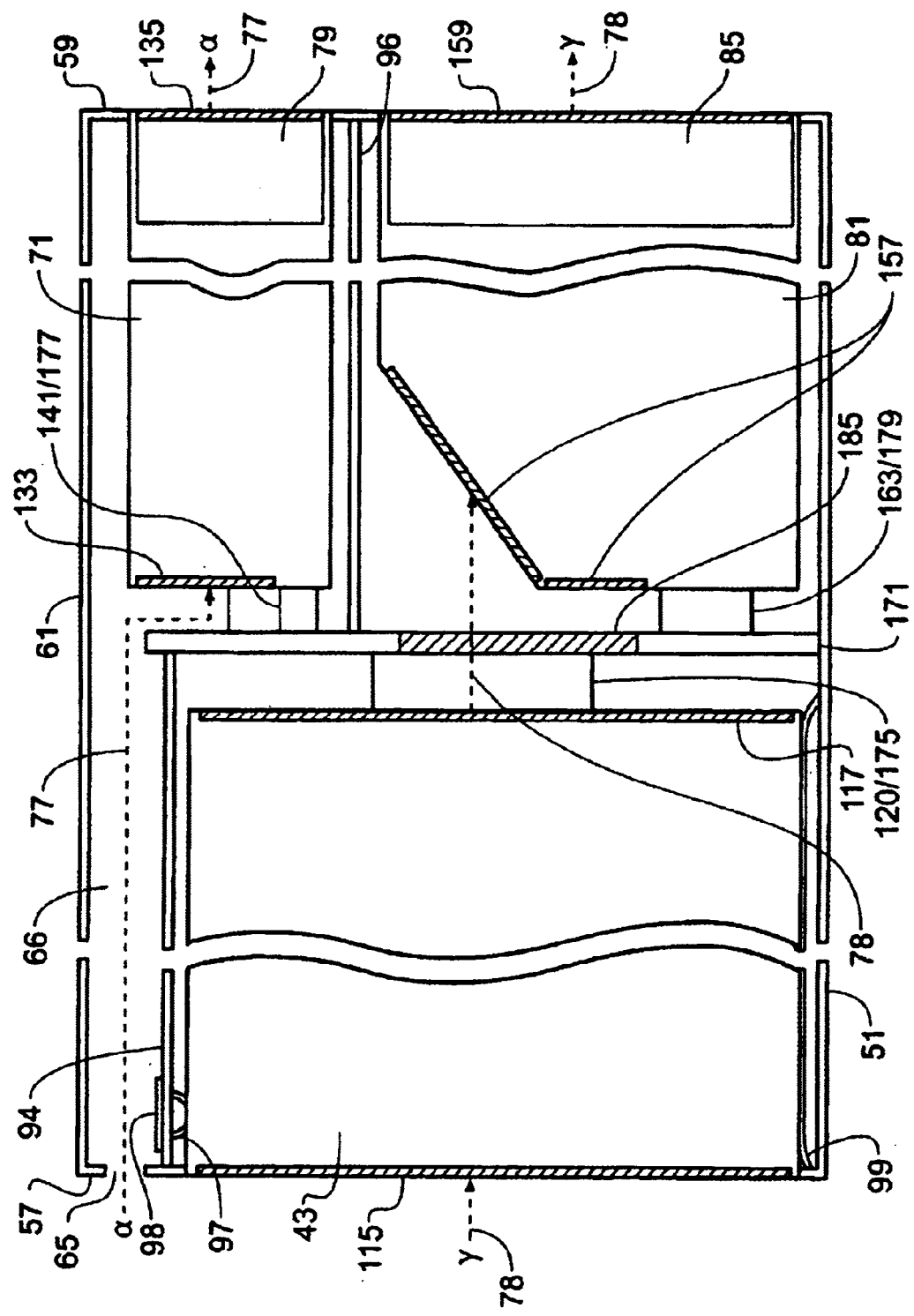
FIG. 10 is a schematic cross section view through the shelf of FIG. 2.

With reference to FIGS. 10A-10C, there now follows a description of functional elements of a switch 50 as contained within the switch enclosure 52. FIG. 10A provides an overview of the functional components of the switch 50. FIG. 10B illustrates which of those components are provided on a switch component board, and FIG. 10C illustrates which of those components are provided on a processor component board.

The midplane connector 57 on the switch 50 establishes the connection between the switch 50 and the midplane. It supports up to 84 connections (pins) that will deliver SERDES outputs 591–594, I2C signals 596, and power 598, 599. Signal connections may be made through a 40-pair right-angled connector. Power connections are made through a 3 information processing cartridge right-angled connector. The connector is configured to facilitate hotswapping of the board with a low insertion force. The connector also uses guide pins to increase the ease of serviceability and prevent module misalignment during insertion.

An interboard connector pair 550, 551 within the switch enclosure establishes a connection between the switch component board 501 and the microprocessor component board 502. It supports connections (pins) for I2C signals, PCI bus bridging, 10/100 Ethernet PHY output, and power to the DC/DC converters. The switch component board 501 carries the switching components and interfaces and the processor component board 502 carries all other components, including the CPU, DRAM DIMM and I2C components. A PCI bus 534 is used to bridge the boards together. All signals from the processor component board 502 are routed through the inter-board connector to the switch component board. The switch component board 501 then provides connections to the midplane 80 through the midplane connector 57.

A switch microprocessor 512 is, in the present example (a Power PC (MPC8245)), packaged in a 352 pin Tape Ball Grid Array (TBGA) package, This microprocessor 512 supports between 1 MB to 2 GB of address space in the present example. It further includes an Embedded Programmable Interrupt Controller (EPIC) that provides 5 hardware interrupts (IRQs) or 16 aerial interrupts. There are 4 programmable timers with cascade mode function.

A 32 bit PCI bus 534 operates at 33 MHz/66 MHz. A four-pin UART or dual two pin UARTs (DUART) are used as test/debug port (3 pin RS232). A commodity PC133 ECC DIMM 430 is provided with a 64 bit+8 bit data pat with ECC.

There are two BCM5632 Gigabit switch ASICs 540, 541. Each ASIC provides twelve GMII Interfaces (1 Gigabit Ethernet) and one 10 Gb XGMII interface. The XGMII interface (10 Gb) is used to allow chip-to-chip communication (bridging) 542 between the ASICs 540 and 541. Sixteen 1 Gb 'downlinks', in the form of serialized Gbit Ethernet data through four quad SERDES 543–546, allow each information processing cartridge to communicate with the switch 50. Eight 1 Gb 'uplinks' will be provided for external communication through two quad PHYs 547 and 548 and RJ45 connectors on the rear panel. The ASICs 540 and 541 are configured through its PCI interface (32 bit/33 MHz) to the PCI bus 534.

A Flash PROM 552 stores a real time operating system, and management and configuration data for the microprocessor. The Flash PROM 552 is operable to hold 8 MB–16 MB of data, depending on the software required. The flash PROM 552 is operated via an on-chip Xbus 553.

An 8 kByte I2C EEPROM 554 is used to store the FRU-ID and is accessible by the SSP 60. The upper 2 kByte of the EEPROM 554 is write protected. An 8-bit general purpose IO expansion chip 555 is provided for an I2C bus 556.

A system hardware monitor 557 performs management functions including monitoring all the voltage rails from DC/DC converters 559 to ensure that they are within limits specified in its limit registers, with watchdog comparisons of all DC/DC converter outputs being made. The system hardware monitor 557 also has tachometer inputs that are connected to tachometer outputs of the switch fan 560 to detect fan failures. A fan failure is reported through the I2C bus 556.

For IO to the midplane, the midplane connector 59 includes the sixteen 1 Gigabit Ethernet connections 591–594 from the four quad SERDES 543–546, one 100 BASE-T connection to the SSP 595, and the I2C bus lines 596.

The SSP 60 has access to the I2C devices (FRU-ID EEPROM, 8-bit I/O expansion chip, and the system hardware monitor) through the midplane 80.

For external IO, rear panel Gigabit Ethernet connections are provided from the two quad PHYs 540, 541 to 2×4 stacked RJ45 connectors (8 uplinks). Each port is an independent 10/100/1000 BASE-T (auto negotiating) port. The PHY devices 540, 541 operate in GMII mode to receive signals from the 8-Gigabit interfaces on the ASICs 530, 532.

An integrated MAC/PHY device 561 provides its own interface to the PCI bus 534. This MAC/PHY device 561 provides a management interface to the SSP 60. The connection from the integrated MAC/PHY device 561 to the SSP 60 is coupled capacitively. A loopback mode is provided by the MAC/PHY device 561 for system diagnostics.

An I2C regulator 562 is powered as soon as the switch is fully inserted into the midplane. This is facilitated through short pins connected to a soft start controller 563, which controls a ramping-up of voltage levels. SSP software turns on the other DC/DC regulators through the 8 bit IO expander 555.

For power, dual 12V input secondary converters 559 are provided with the soft start controller 563 to facilitate hot-insertion. The DC/DC converters 559 are individually fused 564, 565 and then diode commoned 566, 567. A 5V DC/DC converter (I2C power regulator) is turned on as soon as the switch 20 is fully inserted. A 3.3V DC/DC converter is not turned on until the 8 bit IO expander 555 turns them on through SSP service software (ON_L is asserted low). The 3.3V converter turns on the 2.5V, 1.2V, and V core converter when the voltage are within an appropriate range. All power rails are monitored by the hardware system monitor 557. The outputs of the DC/DC converters 559 are fed in to the A/D inputs of the hardware system monitor 557 and Watchdog comparisons will be made to the volt age limits set in the limit registers.

When the switch 50 is inserted into the midplane 80, the inrush current is limited to <1 A and the rate of rise does not exceed 20 A/s. The intent is to prevent damage to the connectors and to avoid generating noise. A soft start controller, which controls a ramping-up of voltage levels, is enabled when an INSERTED_L signal is asserted low, this signal being on a short pin in the connector and being connected to GND through the midplane until one of the supplies is removed. These circuits are configured to withstand an overvoltage at their inputs whilst the input they are feeding is not powered, without any leakage to the unpowered circuit. A sense circuit detects if the voltage has dropped below 2.0V (from either a blown fuse or a power rail going down). The DC/DC converters 559 are protected against short circuit of their outputs so that no damage occurs.

A fan 560 provides cooling. The fan 560 runs at full speed to prevent overtemperature conditions by minimizing the temperature of the internal components and the fan. The speed of the fan 560 is monitored by the SSP 60 through the system hardware monitor 557 on the switch 50. The system hardware monitor 557 is alerted in the event of the fan speed falling below 80% of its nominal speed. The fan provides tachometer outputs to facilitate the measurement of fan speed.

LED indicators 568 are provided, with a green power LED, an amber LED for indicating that service is required and a blue LED for indicating that the switch is ready to be removed. LED indicates integrated on 2×4 stacked RJ45 connectors on the front panel show green when the link is present and flash green when the link is active.

Figure 11:
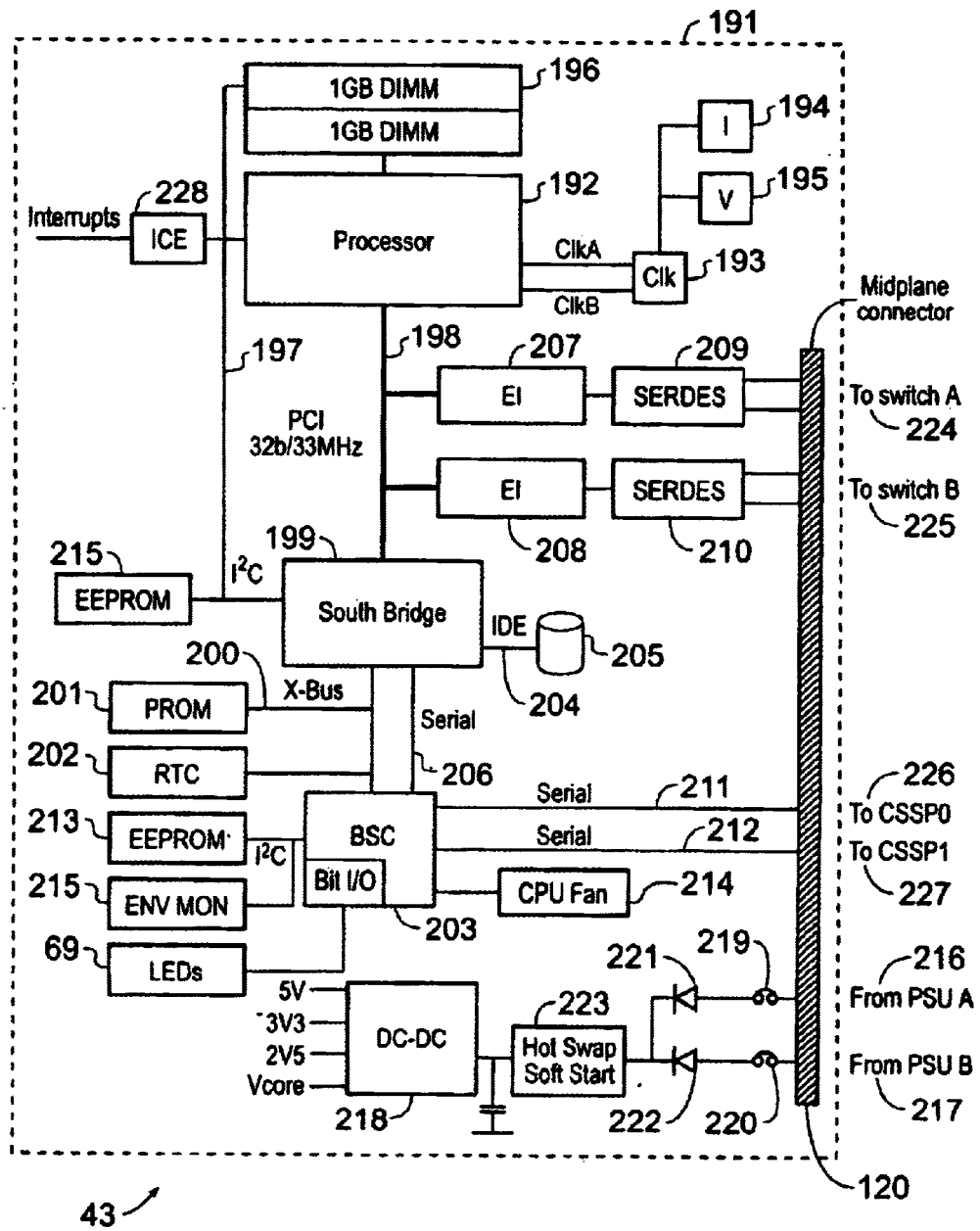
FIG. 11 is a functional block diagram of an example of an information processing subsystem for the information processing cartridge of FIG. 5.

With reference to FIG. 11, there now follows a description of functional elements of the SSP 60 as contained within the SPP enclosure 62.

The SPP 60 includes a microprocessor 612 (in the present example an UltraSPARC processor). The microprocessor is mounted on an information processing cartridge motherboard 610.

A configurable clock generator 614 is implemented as a programmable clock synthesizer employing a crystal used to produce CPU clock signals, CLKA and CLKB. The clock frequency is determined by jumper settings (not shown). A vectored interrupt controller (I-Chip) 616 and a configurable core voltage regulator module (VRM) 618 are provided.

The SPP 60 supports one commodity buffered PC133 dual in line memory module (DIMM) 630 with a 72-bit data path with error correction codes (ECC). The memory capacity can be chosen to suit the processor addressable memory space. In the present example, up to 1 GB of addressable memory can be provided. Serial Presence Detect (SPD) auto-configuration is provided via an SMBus over an I2C bus 632.

A PCI bus architecture is employed with a so-called SouthBridge bus bridge 636 with SuperIO. A 32 bit PCI bus 634 from the microprocessor 612 at 33 MHz and uses 3.3V signaling. The SouthBridge 636 is a standard form of bus bridge packaged in a 352 pin PBGA package that provides the following functions:

- an SM Bus interface over the I2C bus 632 for access to the SPD (Serial Presence Detect) feature of the DIMMs that allows initialization of the memory controller;
- an Xbus interface for access via an Xbus 636 to a PROM, a real time clock 640 and a SSP service controller (hereinafter termed a SSP Service Controller (SSC)) 642;
- an IDE interface that provides an ATA-100 IDE connection 644 to an IDE disk drive 646; and
- serial console interfaces on a service bus 649 to the SSC 642 and 648 to a rear panel connector 680; and
- a USB connection to the rear panel connector.

An Ethernet MAC/PHY device 650 provides a connection to an embedded switch device 651 on the SSP 60. This connection can be capacitively coupled. The embedded switch 650 provides a connection from the external management network to the SSP 60 and switches 50 and also from the SSP 60 to the switches 50. The embedded switch 650 is controlled by an H8 microcontroller 656 via an SPI interface. Although the switch 650 is unmanaged and is intended to be isolated from the rest of the SSP 60, the H8 microcontroller to employed to implement a control protocol. The embedded switch 650 and its H8 microcontroller 656 are powered from a 5VSB rail.

Octal UARTS 652 and 653 are connected between the PCX bus 634 and the midplane connector 67.

A real time clock RTC 654 with a back-up battery is provided. A flash PROM 655 is also provided. These are accessible via the Xbus 636.

The hard disk 646 is accessed using the Primary IDE interface 644 of the SouthBridge. The disk can be the same as the disk used in the information processing cartridges. The hard disk 646 can hold an operating system, for example a Solaris operating system, and other software and data for performing management signal processing using the main, or host, processor (CPU) within the SSP module 60.

The SSP can be provided with a field replaceable memory card 657 to hold network identities (e.g. Media Access Control (MAC) addresses for the shelf and for the 16 blades, as well as other information that may need to be transferable between a failed SSP 60 and its replacement. The memory card data is accessible over an I2C bus 658 via the SSC 642. To remove the memory card 657 from the SSP 60, the SSP 60 must first be removed from the Shelf.

An 16 kByt I2C EEPROM 659 is accessible via the SSC microcontroller 642. The EEPROM 659 contains SSC and boot variables. The EEPROM 656 is nominally divided into 8 kB for the boot variables, and 8 kB for the BSC variables. Write protection is implemented by SSC firmware, typically by acknowledging the writes but not carrying them out.

FRU-ID variables for the SSP 60 are stored in a second 16 kByte I2C EEPROM 655, accessible via the SouthBridge SM Bus port over the Xbus 636. The EEPROM 655 contains 16 kB or FRU-ID of which the upper 2 kBytes is write protected. The write protection is also implemented by the SSC firmware by acknowledging the writes but not carrying them out.

A temperature monitor 670 monitors the CPU and ambient temperature. The temperature monitor 670 is accessible via the onboard I2C bus from the SSC 642.

To provide for external IO, two serial ports are provided. A first serial port (SER A) 675 is provided from the SSC 642.

A second serial port (SER B) 648 is provided from a COM2 port on the Southbridge 636. The serial ports use RS232 compatible signalling levels and are available at RJ45 connectors 671 on the rear face of the SSP enclosure 62. A USB port 0 from the SouthBridge 636 is also made available at a connector 672 on the rear face of the SSP enclosure 62.

As mentioned above, the SSC 642 is implemented by a microcontroller, specifically a Hitachi H8S/2148 microcontroller, part number HD64F2148AFA20. The SSC provides a number of system management functions, including:

- providing dual access via the Xbus 636 (for the information processing cartridges and the SSP) to the EEPROM 655 containing the boot and FRU-ID providing I2C access via the I2C bus 658 to the memory card 657 and via the I2C bus 673 to the EEPROM 659;
- providing I2access to the PSUs 70 and the switches 50 via the midplane 80, with each PSU 70 and switch 50 having an individual I2C bus;
- providing I2C access to the FRU-ID EEPROM for the midplane that is held on the indicator boards 88 and/or 89;
- controlling POR, System_Reset and XIR functions to the microprocessor 612;
- controlling power, service-required and ready-to-remove LEDs for the SSP 60;
- controlling power, service required and ready-to-remove LEDs for the shelf 20;
- controlling on/off functions of DC/DC converters 674 via the Southbridge;
- providing a common operating system/boot console and command port 675 via the rear panel (SER A);
- implementing a watchdog function for the operating system and boot functions;
- monitoring the speed of CPU and auxiliary fans 676 and 677; and
- monitoring the output voltage of the DC/DC converters 674.

The SSC 642 is configured such that it is powered as soon as the SSP 60 is fully inserted into the midplane 80. The SSC 642 is then operable to turn on the rest of the DC/DC converters 674 to provide power to the remainder of the SSP 60. An SSC reset signal is derived from a simple power-on-reset (POR) generator that monitors the 5VSB rail.

When the SSP 60 is inserted the inrush current is limited to <1 A and the rate of rise is configured not to exceed 20 A/s to provide a so-called soft start to facilitate hot-insertion. The intent is to prevent damage to the connectors and to avoid generating noise. A soft start controller, which controls a ramping-up of voltage levels, is enabled when the INSERTED_L signal is asserted low, this signal is on a short pin in the connector and is connected to GND through the midplane 80.

The CPU fan 676 is not speed controlled and runs at full speed. The intent is to minimise the temperature of the SSP 60 and the fan 676. The speed of this fan is monitored by the SSC 642 using a tachometer sense pin on the H8 microcontroller. In the event of the fan speed falling below 80% of its nominal speed, the SSC 642 generates an alert. The nominal speed of the fan is recorded as part of the SSC EEPROM contents.

As mentioned above, the SSC controls the LED status indicators 64 on the SSP, including a green power LED, an amber LED for indicating that service is required and a blue LED for indicating that the SSP is ready to be removed.

These indicators are driven by the SSC 642 by active low outputs and are powered from a 5VSB rail. The SSP also controls the shelf indicators at the front and rear of the system, including the white locator LED that can be switched by the user for locating the system; the green power-on LED to indicate when the system is powered; and the red service-required LED to indicate a fault or other condition requiring servicing. These indicators are driven by the SSC 642 using active high outputs, and both of the front and rear shelf indicators are powered from the 5VSB rail.

The connector between the SSP 60 and the midplane 80 is provided by a 5-row, 2 mm pitch right angle female connector. A guide pin arrangement prevents misaligned modules during insertion causing bent pins.

SSP midplane connections 67 interconnect the SSP 60 and the midplane 80. They include connections (pins) for the OCTART circuits 652, the I2C bus and power. Signal connections are provided through a 5-row, 2 mm pitch right angle female connector and power connections are provided through a 3-pin right angle connector.

The connectors are configured to facilitate the hotswapping of the SSP cartridge with a low insertion force. The connector also uses guide pins to increase the ease of serviceability and prevent module misalignment during insertion.

There now follows a description of aspects of a power supply 70.

The PSUs 70 are configured such that when two or more PSUs 70 are connected in parallel in the shelf 20, failure of any one of the paralleled units shall not affect system operation. Moreover, one of the PSUs can installed or removed from a "live" system with or without input power applied. All outputs have overcurrent protection.

The PSU has an I2C interface to provide power supply status via the midplane 80. The PSU has an internal temperature sensor that reports via the I2C interface. The PSU fan speed is also monitored and errors are reported via the I2C interface. Overvoltage and overcurrent sensors also report via the I2C interface.

The power supply has four front panel LED indicators. A blue "Ready to Remove" LED is driven by the I2C interface and indicates that the power supply may be removed from the system. An amber "Service Required" LED is driven by the I2C interface and indicates that the power supply is in a fault condition: any output out of range, over-temperature or shutdown. A green "DC Output-OK" indicator is driven by internal power supply circuits and shows that the main 12 volt supply is functioning. The LEDs remain lighted when individual outputs are in the current limited mode of operation. A green "AC Input-OK" indicator is driven by internal power supply circuits and shows that AC input power is within normal operating range.

The PSU 70 connects to the shelf through a 5P/24S/6P configuration SSI-MPS compliant right angle connector at the front face 722 of the PSU 70. Connectors for the I2C interface are also provided. A power inlet 71 for each PSU 70 incorporates a cable/connector retention mechanism on the rear face 721 of the PSU to prevent accidental or malicious removal of the power input cord from the PSU.

It will be appreciated from the above that a flexible and scalable modular computer architecture has been described. In the described embodiment up to 16 information processing cartridges, or blades 40, are configured as sealed FRUs on a single shelf 20, the number of blades being chosen according to customer requirements. Each blade has its own processor and random access memory. If, for example, there is a maximum of 2 Gbytes of memory per information processing cartridge, this provides for a maximum system of 16 processors (16P) with 5.33 processors per unit height (IU) and a total of 32 GB of memory per shelf.

The shelf 20 incorporates a shelf service processor (SSP) module 60, redundant switch modules 50 and redundant power supply units (PSUs) 70 separate from the blades 40. As the power supplies are carried by the shelf, the information processing cartridges can be kept compact and inexpensive. Also, as a result, they can be powered by DC power only, via the midplane 80.

Also, as mentioned earlier, the FRUs (that is the information processing cartridges, or blades, 40, the switches 50, the SSP 60 and the PSUs 70) are all configured as sealed units that do not contain any internal FRUs themselves and do not contain user serviceable items. The enclosures of the FRUs enclose all of the functional components of the FRU with only electrical connectors being externally accessible and with indicator LEDs being externally visible as well.

These factors all contribute to keeping the cost of the FRUs low, as well as that of the overall system. The modular approach with the use of sealed modular field replaceable units for providing system functionality and with non-field replaceable units being designed with a minimum possible number of active components enhances reliability. Moreover, easy and rapid maintenance is then possible in the event of a failure of a FRU by simple replacement of that FRU, further reducing the cost of ownership.

Thus, it will be appreciated from the above description that the provision of a rack mountable shelf, that includes power supplies, a shelf service processor and switches in modular units, for carrying a number of processing cartridges, wherein the number of processing cartridges can be chosen according to customer requirements, provides a flexible and scalable computer configuration. The balancing of the load between the processors of the processing cartridges can be effected by software using conventional principles.

A configuration as described provides an easily scalable processor architecture, whereby the processing power provided by a complete system based on the information processing cartridge/information processing cartridge carrier architecture can be scalable from moderate to very high capacity though the simple addition of further information processing cartridges.

Figure 12:
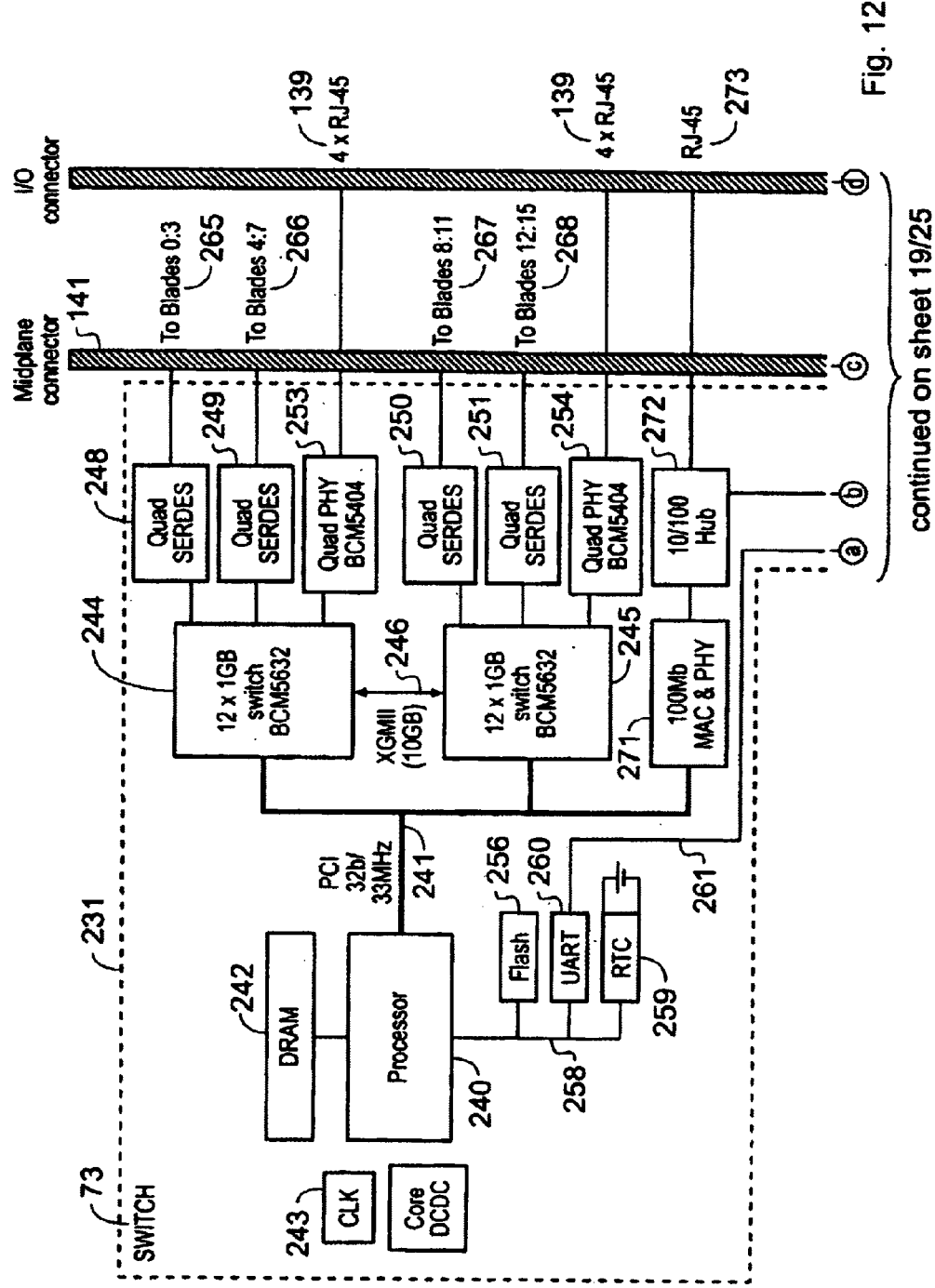
FIG. 12 is a functional block diagram of an example of an information processing subsystem for the combined switch and service processor module of FIG. 6.

As illustrated in FIG. 12, the external connections from a shelf 20 are in the form of two information signal connection (e.g., Ethernet connections) 122 and 124, power connections 126 and a signal management connection 128. It will be appreciated, therefore, that the connections to a shelf can be kept to a minimum. It will further be appreciated from the configuration shown in FIG. 12 that the system is scalable beyond a single shelf unit 20.

Figure 13:
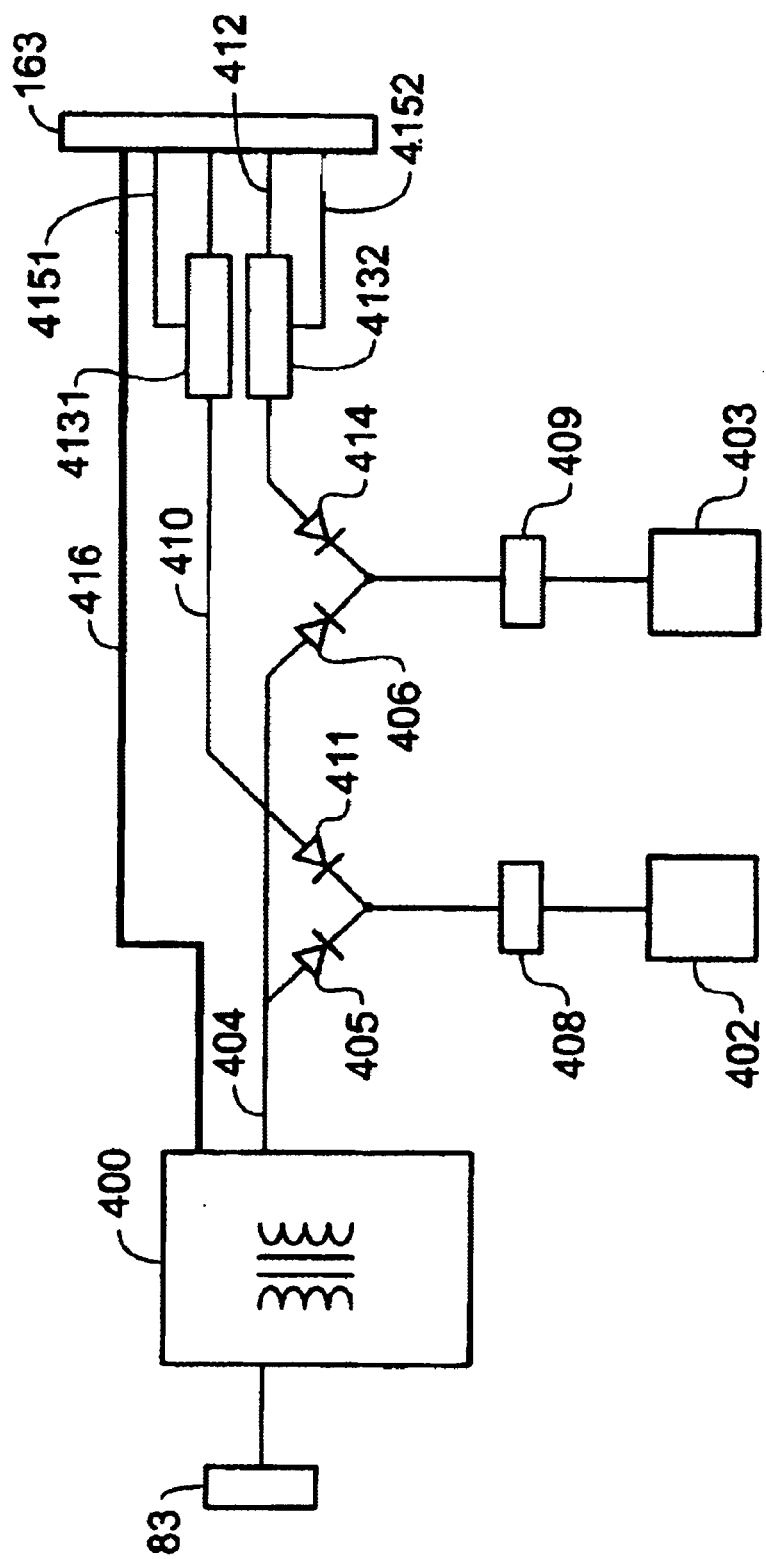
FIG. 13 is a functional block diagram of an example of a subsystem for the power supply unit of FIG. 7.

FIG. 13 illustrates how a plurality of shelves can be configured within one (or more) racks to provide even high processing power. Such a constellation of shelves to provide a large grouping of servers is sometimes termed a "web farm" 130. As shown in FIG. 13, the web fan comprises a plurality of shelves 20 that each carry a plurality of blades 40. Also provided are a plurality of network attached storage devices (NAS) 132 that form storage components that can be accessed by the various processors in the shelves 20 via the Ethernet connections 876 and 878 from the shelves 20.

Figure 14:
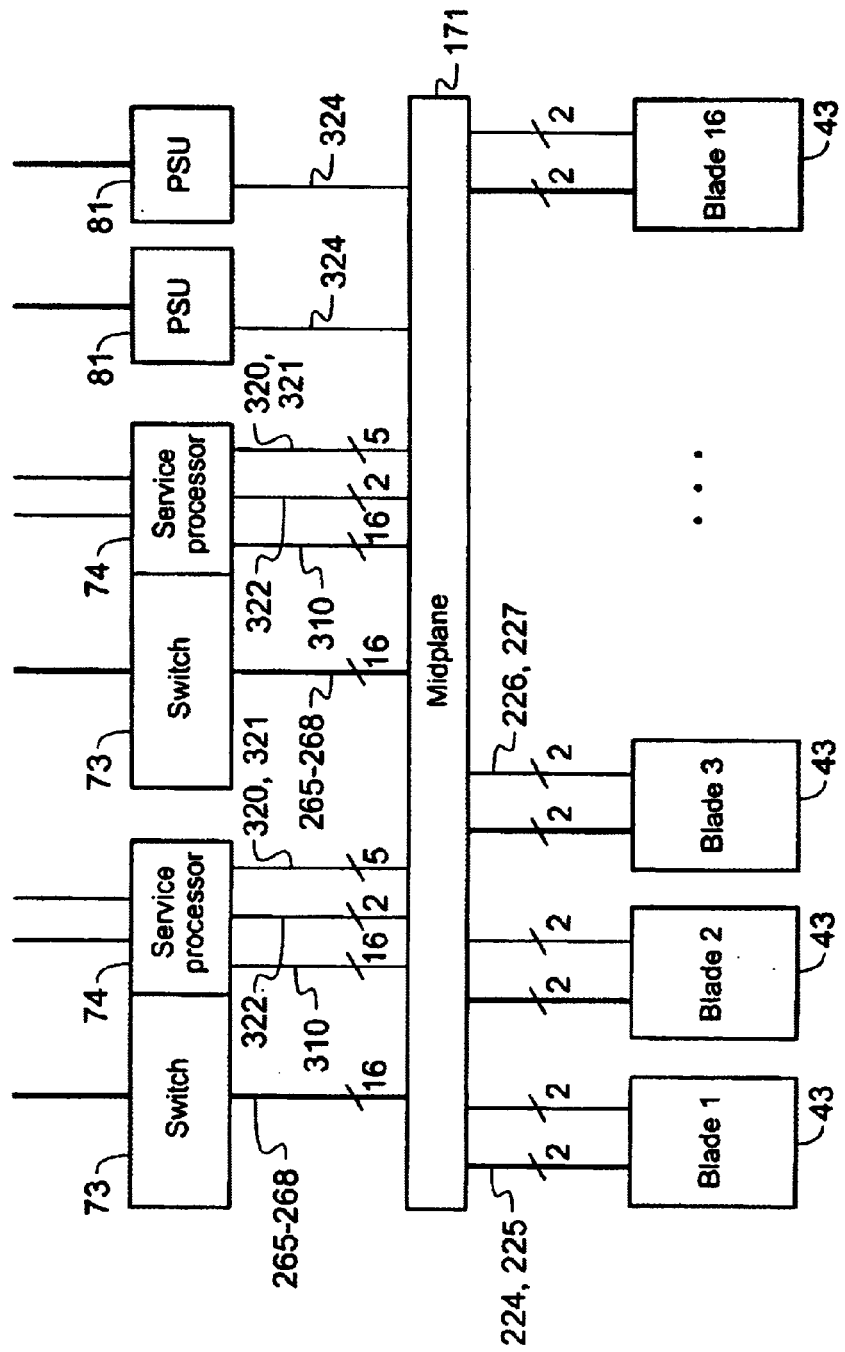
FIG. 14 is a functional block diagram showing the connectivity between the components of the shelf of FIG. 2.
Figure 15:
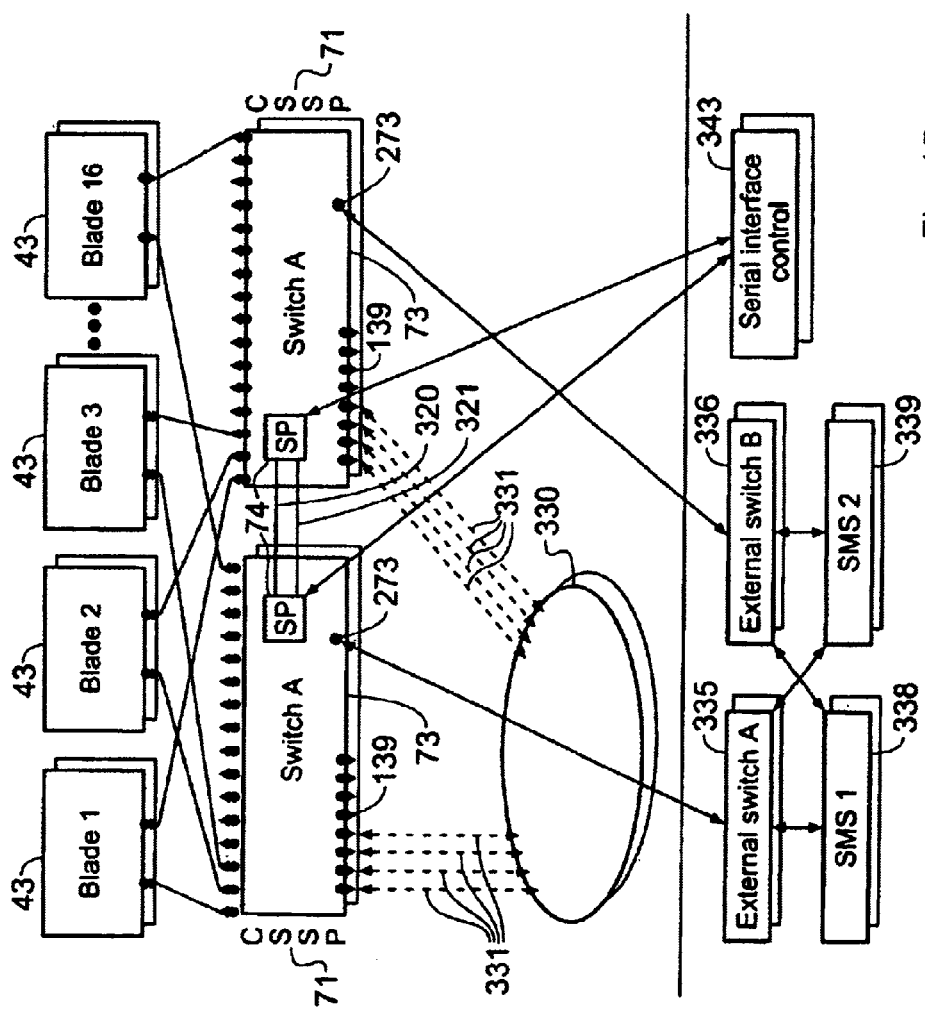
FIG. 15 is a functional block diagram showing the external connectivity of the shelf of FIG. 2.
Figure 16:
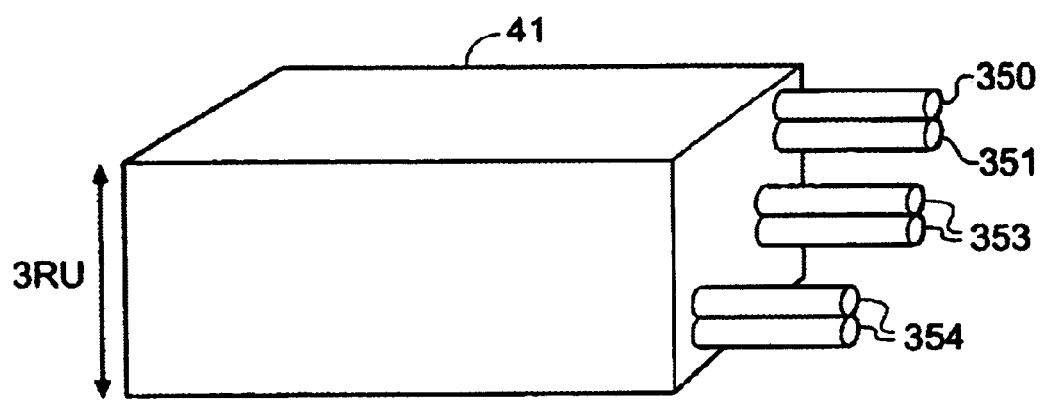
FIG. 16 is a schematic representation of a shelf showing the external connections from the shelf of FIG. 2.
Figure 17:
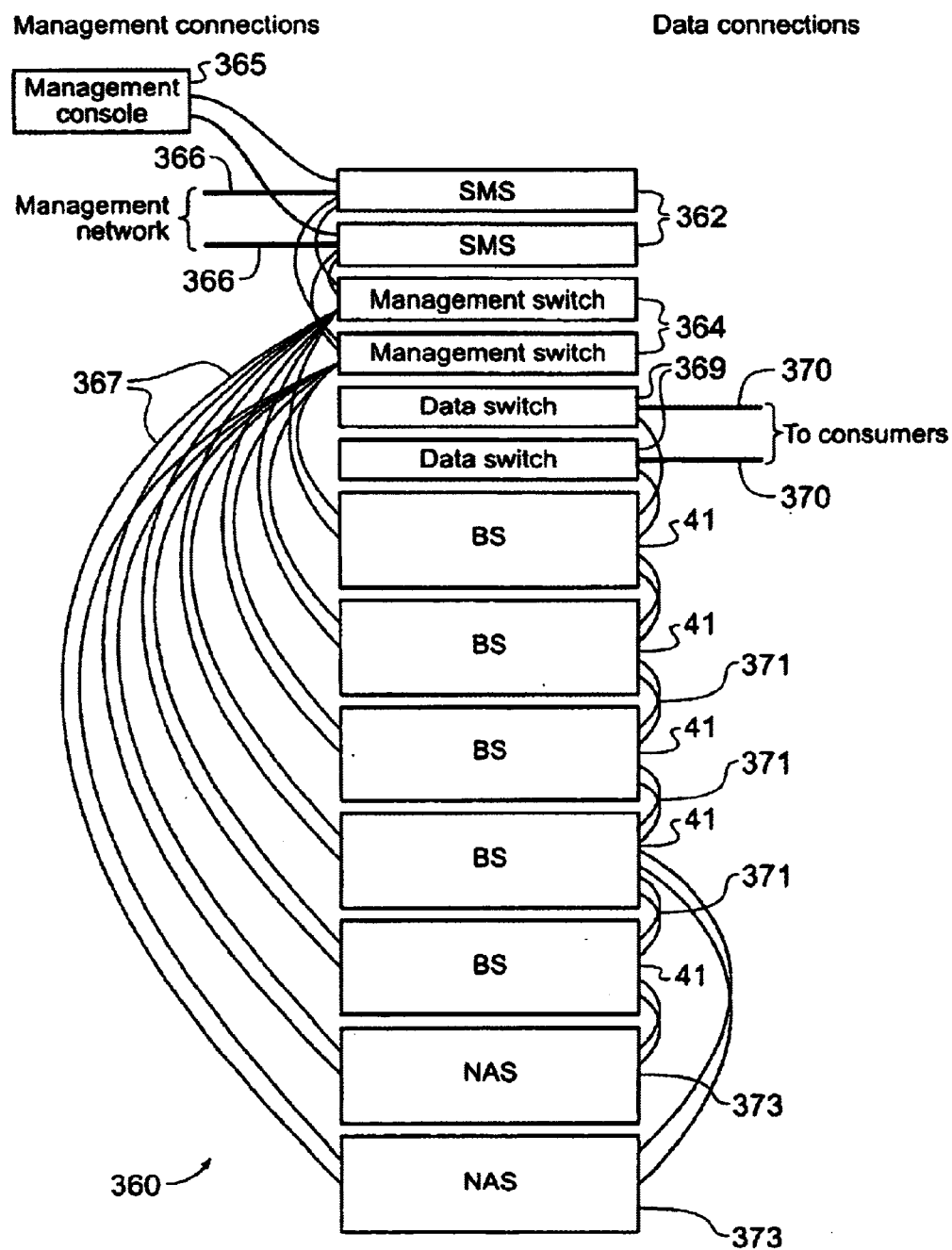
FIG. 17 is a schematic representation of a rack mounted system comprising a plurality of such shelves.
Figure 18:
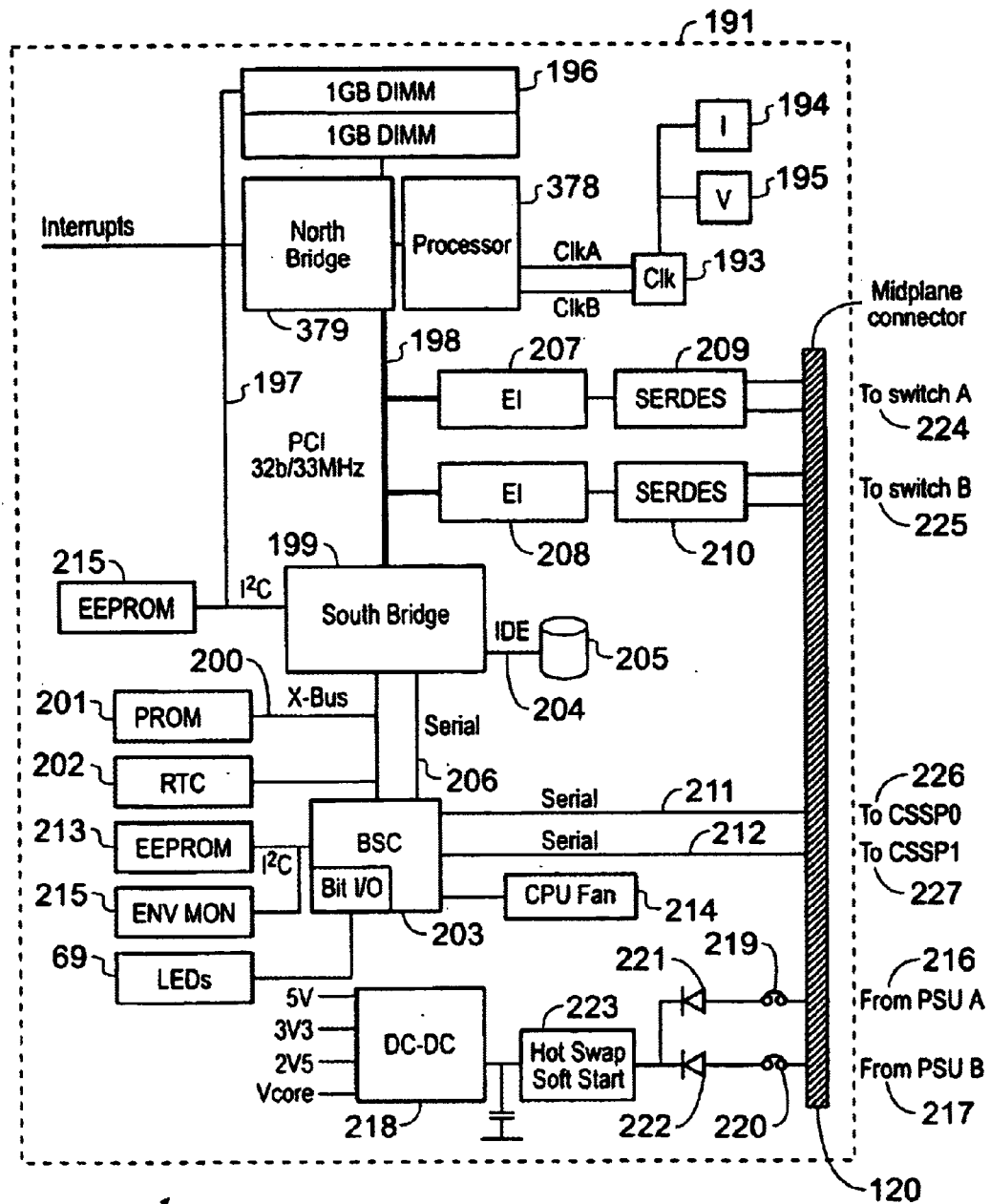
FIG. 18 is a functional block diagram of a further example of an information processing subsystem for the information processing cartridge of FIG. 5.

FIG. 14 illustrates one example of a high multi-server system 140 for implementing a network-connected web site such as, for example, an airline reservation system on the World Wide Web. As shown in FIG. 14, an external network 142 (e.g., the Internet) for communicating with a users 144 can be connected to gateways 146 which are connected to an entry edge server group 148 implemented by a web as shown in FIG. 13. The entry edge server group 148 forms an interface to the external network 142. The entry edge server group 148 is then connected by switches 150 and a firewall 152 to a web edge server group 154 that is also implemented as a web farm as shown in FIG. 13. The web edge server group 154 serves to cache web pages that are readily accessible to users 144 accessing the system 140 from the external network 142, for example for checking fight times, etc. The web edge server group 154 is further connected by a further firewall 156 to a plurality of application servers 158, which are responsible for processing flight reservations. The application servers 158 are then connected via a further firewall 160 to computer systems 162, 168, for example, e-commerce services including financial services for receiving and processing payment for airline reservations.

Accordingly, it will be appreciated that there has been described a system for providing processing power in an extensible and cost effective way with high reliability and easy and rapid maintenance in the event of a fault. The system provides a shelf at is configured as an information processing cartridge carrier for carrying a selectable number of information processing cartridges. The information processing cartridges form a sealed, field replaceable unit containing at least one processor, memory, a storage device and a service controller. The information processing cartridge is configured with a minimum of external connections for data and service management information and for connection to a DC power source. The shelf also incorporates a Shelf Service Processor (SSP) module, dual redundant switch modules and dual redundant Power Supply Units (PSUs). The system can be configured in various ways, with each information processing cartridge having its own processor and random access memory. Embedded storage is provided by a fixed non hot-swappable 2.5" hard disk drive in each of the information processing cartridges and in the SSP module. Built-in network functionality is provided through sixteen 10/100/1000BASE-T network ports, two asynchronous serial ports, two 10/100BASE-T management ports and one USB port.

There has been described a rack mountable shelf that is configured to support a plurality of field replaceable units in the form of server cartridges that each include at least one server processor. The rack mountable shelf is configured to provide communal services for said server cartridges, including at last one of supplying DC operating power to the server cartridges, distributing information signals between the server cartridges and processing system management signals for the server cartridges. Each of the server cartridges can be slideably received in a respective one of a series of server cartridge receiving locations arrayed side by side along the front of the shelf. The server cartridges can be configured as thin blades to provide a high server density. For example, 16 server cartridge receiving locations can be provided across the front of the shelf. The supply of DC operating power to the server cartridges can be provided by one or more field replaceable power supply units (e.g. two redundantly configured power supply units) mounted in the shelf. The distribution of information signals between the server cartridges can be provided by one or more switch units (e.g. two redundantly configured switch units) mounted in the shelf. The processing of system management signals for the information processing cartridges is provided by one or more field replaceable service processor units (e.g. one service processor unit) mounted in the shelf. Each of the power supply, switch and service processor units can be slideably received in a respective receiving location at the rear of the shelf. A midplane including connectors with conductive paths therebetween can provide power, information signal and system management signal connections between received field replaceable units. A multiple computer server system can be formed from at least one rack mountable shelf as set out above.

Although a particular embodiment of the invention has been described, it will be appreciated that the invention is not limited thereto and that many modifications, including additions, deletions ad substitutions may be made within the scope of the claimed invention.

For example, although in the described embodiments, the information processing cartridge carrier supports a plurality of cartridges, it would also be possible to configure a standalone server or processor application having lower processing requirements. For example, an information processing cartridge carrier could be configured as a base station with display and I/O interfaces for the connection of I/O devices (e.g., keyboards, background storage, network cards, etc.) and a display. Particularly if a limited number of one or more slots for receiving a respective information processing cartridge were provided in the base station, a computer for personal or business use at a work station could be provided.

What is claimed is:

1. A server blade configured to be receivable as a field replaceable unit in a carrier of a blade server system, the server blade comprising:

a blade enclosure that is substantially slab-shaped with two opposing side faces, a front edge face, a rear edge face, an upper edge face and a lower edge face;

wherein the blade enclosure includes at least one ventilation opening on each of the front and rear edge faces to permit a flow of cooling air though the enclosure between the front and rear edge faces;

wherein the blade enclosure is configured to be slideably mountable in the carrier such that the rear edge face is inserted first;

wherein the blade enclosure includes connections accessible externally to the blade enclosure and located on the rear edge face;

wherein the blade enclosure has a narrow elongate form;

wherein the side faces and the upper and lower edge faces have substantially the same length, but the side faces are narrower than the upper and lower edge faces; and wherein the front and rear edge faces have a length substantially equivalent to the width of the side faces and a width substantially the same as the width of the upper and lower edge faces.

2. The server blade of claim 1, comprising at least one processor within the blade enclosure.

3. The server blade of claim 1, comprising random access memory within the blade enclosure.

4. The server blade of claim 1, comprising a service controller within the blade enclosure providing system management functions.

5. The server blade of claim 1, comprising a storage device within the blade enclosure.

6. The server blade of claim 1, wherein the connections include at least one information signal connection.

7. The server blade of claim 1, wherein the connections include at least one system management signal connection.

8. The server blade of claim 1, wherein the connections include at least one power connection.

9. The server blade of claim 1, wherein the blade enclosure further encloses a fan operable to move cooling air within the blade enclosure.

10. The server blade of claim 1, wherein the front edge face includes server blade status indicators.

11. The server blade of claim 1, comprising an injector lever mechanism for facilitating insertion and removal of the server blade with respect to the carrier.

12. The server blade of claim 1, wherein the blade enclosure is formed from conductive material.

* * * * *